US011392819B1

(12) United States Patent
Valentin et al.

(10) Patent No.: US 11,392,819 B1
(45) Date of Patent: Jul. 19, 2022

(54) HOLODOUBLE: SYSTEMS AND METHODS FOR LOW-BANDWIDTH AND HIGH QUALITY REMOTE VISUAL COMMUNICATION

(71) Applicant: MICROSOFT TECHNOLOGY LICENSING, LLC, Redmond, WA (US)

(72) Inventors: Julien Pascal Christophe Valentin, Zurich (CH); Erik Alexander Hill, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/175,151

(22) Filed: Feb. 12, 2021

(51) Int. Cl.
*G06T 15/20* (2011.01)
*G06N 3/00* (2006.01)
*H04N 7/15* (2006.01)
*G06K 9/62* (2022.01)
*G06V 40/16* (2022.01)

(52) U.S. Cl.
CPC ........... *G06N 3/006* (2013.01); *G06K 9/6256* (2013.01); *G06T 15/20* (2013.01); *G06V 40/169* (2022.01); *G06V 40/176* (2022.01); *H04N 7/157* (2013.01)

(58) Field of Classification Search
CPC ...... G06N 3/006; G06K 9/6256; G06T 15/20; G06V 40/169; G06V 40/176; H04N 7/157
See application file for complete search history.

(56) References Cited

U.S. PATENT DOCUMENTS

| 11,270,487 | B1* | 3/2022 | Steptoe | G06T 7/20 |
| 2008/0151786 | A1* | 6/2008 | Li | H04M 3/2227 370/276 |
| 2016/0004905 | A1* | 1/2016 | Lucey | G06V 40/161 382/118 |
| 2018/0342091 | A1* | 11/2018 | Seibert | G06T 11/60 |
| 2021/0375020 | A1* | 12/2021 | Zhang | G06T 7/251 |
| 2022/0028157 | A1* | 1/2022 | Cabral | H04N 7/147 |
| 2022/0072377 | A1* | 3/2022 | Russell | G06V 10/25 |

* cited by examiner

*Primary Examiner* — Jitesh Patel
(74) *Attorney, Agent, or Firm* — Workman Nydegger

(57) ABSTRACT

A system receives input from a user to initiate a process of generating a holodouble of the user. The system obtains image data of the user and deconstructs the image data to obtain a set of sparse data that identifies one or more attributes associated with the image data the user. The system uses a holodouble training model to generate and train the holodouble of the user based on the set of sparse data and obtained image data. The system renders a representation of the holodouble to the user concurrently while capturing new image data of the user, receives input from the user comprising approval of the holodouble, and completes training of the holodouble by saving the holodouble for subsequent use. The subsequent use includes one or more remote visual communication sessions.

29 Claims, 14 Drawing Sheets

HOLODOUBLE: SYSTEMS AND METHODS FOR LOW-BANDWIDTH AND HIGH QUALITY REMOTE VISUAL COMMUNICATION

BACKGROUND

Video conferencing technology can be used to facilitate audiovisual communication between users that are remote from one another. For example, a first device may capture audio and video of a first user and transmit the audio and video data to a second device for presentation to a remotely positioned second user to facilitate near-real time communication between the first user and the second user. Similarly, the second device may capture audio and video of the second user and transmit the audio and video data to the first device.

Video conference is widely used in diverse contexts and provides remote communication in a manner that preserves nonverbal signals and cues (e.g., facial expressions) that are lost in communication techniques that lack a visual component (e.g., phone communications). However, existing video conferencing technology is associated with a number of shortcomings.

For example, existing systems for facilitating remote visual communication between users often utilize high bandwidth in order to provide only average or poor video or image frame quality. Although many video conferencing techniques attempt to compress image frames to reduce bandwidth usage, such techniques often give rise to compression artifacts that can negatively affect user experiences. For example, a greater compression ratio may lead to a greater number of artifacts present in the compressed image frames.

Furthermore, users participating in video conferencing often desire that they will be perceived by other participants under preferred conditions. For example, a user participating in a video conference may desire to be captured by a camera from a particular perspective (e.g., a head-on perspective with the camera horizontally aligned with the user's eyes) so that other participants perceive the user according to the particular perspective. Other examples of preferred conditions may be related to camera distancing from the captured user, lighting conditions, user attire, user personal hygiene and/or grooming conditions, and/or others.

In many instances, preferred conditions for video conferencing are difficult or impractical to maintain. For example, users often participate in video conferencing from diverse locations, in diverse contexts, and with diverse devices. For instance, a user may receive a video call (e.g., from a supervisor) while the user is not appropriately dressed or groomed for such a call, or when the user is not in an ideal location for such a call. Furthermore, in some instances, a user receives a video call while the user is in a private location, and the user may desire to refrain from broadcasting details of the private location to other users in the video call.

In some instances, a user operating a mobile electronic device (e.g., a smartphone) may be able to achieve an ideal, head-on camera perspective by holding their device from a position extended away from their body, but such positioning may be tiresome to maintain for long periods of time and may present obstacles to locomotion by and/or about the user. Furthermore, a user attempting to maintain such a position may cause inadvertent shaking or movement of the camera, which may cause motion blur and/or other undesired effects.

In view of the difficulties associated with maintaining such a head-on camera perspective, users often revert to holding a mobile electronic device from a relaxed position with their hand closer to their body and at an elevation below their head. Such positioning causes the camera of the device to capture the user's face from a perspective that looks upward toward the user's face. Such an upward perspective, however, is often regarded as unflattering, as it can provide undesirable views of the nostrils of the user and of accentuated neck features of the user (e.g., as the user orients their head downward toward the camera and device).

Furthermore, as noted above, users often participate in video conferencing from various locations and/or while traveling between locations. Accordingly, users often encounter limited or varying connectivity to wireless networks while participating in video conferencing, which can negatively affect the quality of the transmitted image frames or can entirely preclude participation in video conferencing (e.g., reverting to audio only).

Any difficulties associated with video conferencing, such as those described hereinabove, may be exacerbated when more than two users are participating in video conferencing.

Still furthermore, some video conferencing platforms are configured to display image frames received from other participants in an arrayed manner, such that users can simultaneously view more than one other participating user. Some platforms further present the image frames in a stylized arrangement, such as to emulate audience seating with representations of the other participants placed among the audience. However, because different devices may capture participating users from different perspectives and depths, a simultaneous presentation of multiple other participating users may give rise to discrepancies between adjacently arranged presentations of other participating. For example, adjacently "seated" presentations of other participating users may appear as though the other participants are at different depths, even though one would expect other participants that are "seated" next to one another to appear at about the same depth.

Thus, for at least the foregoing reasons, there is an ongoing need and desire for improved systems and methods for facilitating remote visual communication.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed to systems, methods and devices that facilitate low-bandwidth remote visual communication.

Some embodiments include a system for facilitating low-bandwidth remote visual communication based on real-time imaging. The system includes one or more processors and one or more hardware storage devices storing instructions that are executable by the one or more processors to configure the system to perform various acts.

The system is configured to receive input from a user to initiate a process of generating a holodouble of the user. The holodouble includes a photorealistic three-dimensional (3D) simulated representation of the user. The system is also configured to obtain image data of the user within an environment that is captured by a camera from multiple perspectives of the user relative to the camera, and to deconstruct the image data to obtain a set of sparse data that identifies one or more attributes associated with the image data the user.

The system is also configured, in some instances, to use a holodouble training model to generate and train the holodouble of the user based on the set of sparse data and obtained image data. The holodouble is, in some instances, enabled to be rendered from a plurality of different perspectives associated with the user, based on new image data of the user, including the multiple perspectives of the user relative to the camera, when the image data was obtained for generating and training the holodouble, as well as from one or more different perspectives of the user relative to one or more cameras that capture the new image data of the user in subsequent image processing.

The holodouble training model includes a machine learned or machine learning model that has been trained on image data of humans and corresponding sparse data of attributes associated with the image data of the humans to generate and render simulations of the humans from different perspectives.

The system is also configured, in some instances, to render a representation of the holodouble to the user concurrently while capturing the new image data of the user, receive input from the user comprising approval of the holodouble, and complete training of the holodouble by saving the holodouble for subsequent use. The subsequent use includes one or more remote visual communication sessions in which the user is visually simulated at one or more second devices as the holodouble corresponding to and concurrently with images that are captured of the user during the one or more remote visual communication sessions at a first device.

Embodiments also include corresponding systems that select, utilize, modify and/or display corresponding holodouble representations of a user during remote visual communication sessions based on real-time imaging obtained of the user and to simulate the user during the remote visual communication sessions (without sending the real-time imaging) to the remote destination device(s) that render the holodouble representations of the user.

The holodouble is rendered, in some instances, on a display device with at least one of a context or perspective of the user that is different than a corresponding context or perspective of the user that is represented in the images captured of the user by the camera during the visual communication session.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
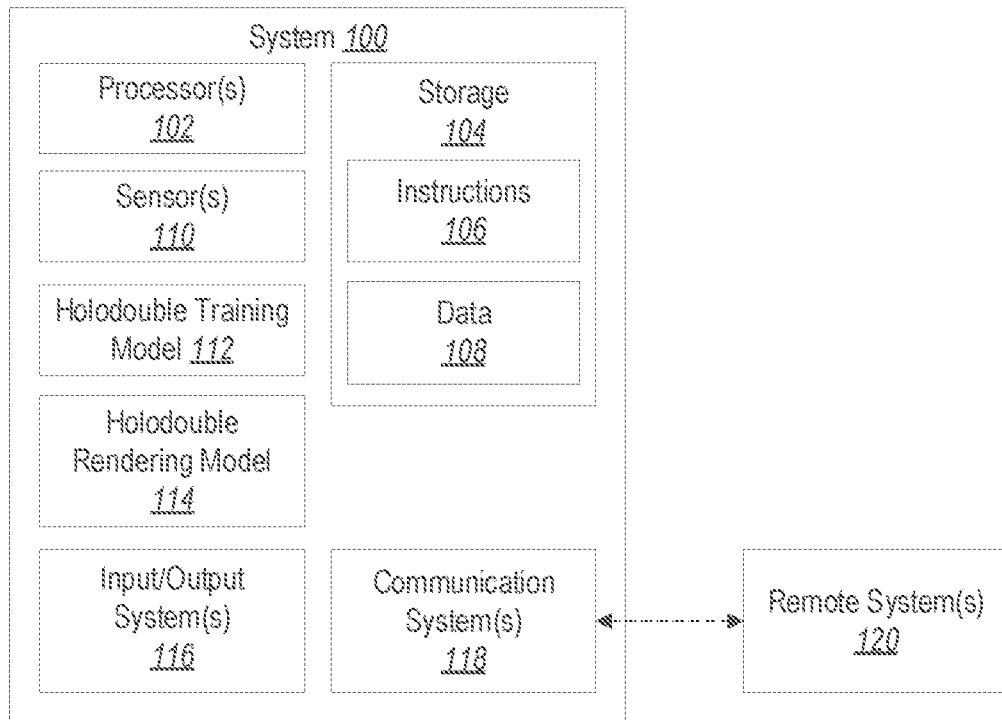
FIG. 1 illustrates example components of an example system that may include or be used to implement one or more disclosed embodiments.

Disclosed embodiments are generally directed at least to systems and methods for facilitating low-bandwidth (and high quality) remote visual communication.

Examples of Technical Benefits, Improvements, and Practical Applications

Those skilled in the art will recognize, in view of the present disclosure, that at least some of the disclosed embodiments may be implemented to provide improved remote communication with visual components. The following section outlines some example improvements and/or practical applications provided by the disclosed embodiments. It will be appreciated, however, that the following are examples only and that the embodiments described herein are in no way limited to the example improvements discussed herein.

In some implementations, facilitating remote communication using one or more holodoubles as described herein allows users to visually communicate with low bandwidth requirements. In one illustrative example, a conventional video conferencing platform facilitating video and voice communication between two users at 30 fps may utilize approximately 3-6 Mbps of bandwidth. In contrast, a system facilitating remote visual and voice communication using techniques disclosed herein may utilize a bandwidth amount that is two or three orders of magnitude smaller than conventional platforms (e.g., 3-6 Kbps). Accordingly, embodiments of the present disclosure may allow users to participate in remote video communication experiences from environments where only low bandwidth is available.

Furthermore, because implementations of the present disclosure may at least partially avoid transmitting compressed images captured at one device for presentation on another device, implementations of the present disclosure may avoid compression artifacts that can degrade user experiences.

In addition, in some instances, implementations of the present disclosure allow users to present visual representations of themselves during remote communication that depict the user as though the user was captured under preferred imaging conditions, even where the captured user is not currently being captured under preferred imaging conditions.

By way of illustrative example, a holodouble may be trained using data capturing the user under preferred imaging conditions (e.g., capturing the user's face from a preferred head-on perspective and/or while the user is wearing preferred attire). At a later time, and from a user device, the user may trigger use of a holodouble for video conferencing with a remote device, even when the user device is not currently capturing the user under preferred imaging conditions (e.g., the user device may capture the user's face from an unflattering perspective, or the user may be wearing inappropriate attire). To facilitate participation in the video conference at the later time, the user device may capture sensor data of the user using one or more sensors of the user device (e.g., image sensors, inertial measurement units (IMUs), microphones, etc.). The sensor data may be used to provide a reconstructed view of the user at the remote device using the holodouble. The reconstructed view of the user may depict the user as though the user were being captured under preferred imaging conditions, even where the user is not currently being captured under preferred imaging conditions.

Continuing with the above example, the reconstructed view of the user may be advantageously generated without transmitting images captured at the user device for display at the remote device. For instance, filtered or sparse data may be determined based on the sensor data, and the filtered or sparse data may be used to generate parameters for causing the holodouble to simulate the user in a photorealistic manner at the remote device.

Still furthermore, because visual communication may be facilitated using sparse data obtained from sensor data, rather than by sending the sensor data itself (e.g., image frames) for display at remote devices, utilizing holodoubles for remote communication in accordance with the present disclosure may ameliorate the effects of camera shaking or other erratic movements during remote communications.

Furthermore, representations of other participating users may be presented to a viewing user in a consistent manner. For example, where other participating users are presented to a viewing user as part of an audience, adjacently arranged representations of other participating users may be depicted with consistent depth.

Having just described some of the various high-level features and benefits of the disclosed embodiments, attention will now be directed to FIGS. 1 through 7. These Figures illustrate various conceptual representations, architectures, methods, and supporting illustrations related to the disclosed embodiments. Also, with regard to referenced systems that are "configurable to" perform certain functionality, it will be appreciated that such references should also be interpreted to cover corresponding systems that are completely configured to perform the referenced functionality, as well as systems that actively perform the referenced functionality.

Example Systems

Attention is now directed to FIG. 1, which illustrates an example system 100 that may include or be used to implement one or more disclosed embodiments. In some instances, the system 100 is implemented as one or more general-purpose or special purpose computing systems, which may take on a variety of forms (e.g., a single device or multiple devices in communication with one another).

FIG. 1 illustrates various example components of the system 100. For example, FIG. 1 illustrates an implementation in which the system includes processor(s) 102, storage 104, sensor(s) 110, input/output system(s) 116 (I/O system(s) 116), and communication system(s) 118. FIG. 1 also illustrates that a system may include or be used to implement various models, including one or more of a holodouble training model 112 and a holodouble rendering model 114. Although FIG. 1 illustrates a system 100 as including particular components, one will appreciate, in view of the present disclosure, that a system 100 may comprise any number of additional or alternative components.

As used herein, the terms "executable module," "executable component," "component," "module," "model," or "engine" can refer to any combination of hardware components or software objects, routines, or methods that may configure a computer system 100 to carry out certain acts. For instance, the different components, models, modules, engines, devices, and/or services described herein may be implemented utilizing one or more objects or processors that execute on computer system 100 (e.g., as separate threads). While FIG. 1 depicts independent models 112 and 114, one will understand the characterization of a model is at least somewhat arbitrary. In at least one implementation, the various models 112 and 114 of FIG. 1 may be combined, divided, or excluded in configurations other than that which is shown. For example, any of the functions described herein with reference to any particular model 112 or 114 may be performed utilizing any number and/or combination of processing units, software objects, modules, instructions, computing centers (e.g., computing centers that are remote to computing system 100), etcetera. As used herein, the individual models 112 and 114 are provided for the sake of clarity and explanation and are not intended to be limiting.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104, along with any of the referenced data described herein (e.g., image data, sensor data, sparse data, parameter data, holodoubles or other related holodouble data).

The storage 104 may comprise physical system memory (e.g., one or more hardware storage devices) and may be volatile, non-volatile, or some combination thereof. Furthermore, storage 104 may comprise local storage, remote storage (e.g., stored in one or more remote system(s) 120 and/or accessible via communication system(s) 118 or otherwise), or some combination thereof. Additional details related to processors (e.g., processor(s) 102) and computer storage media (e.g., storage 104) will be provided hereinafter.

In some implementations, the processor(s) 102 and/or models 112 and 114 described herein may comprise or be configurable to execute any combination of software and/or hardware components that are operable to facilitate processing using machine learning models or other artificial intelligence-based structures/architectures that are integrated into and/or that comprise the referenced modules.

By way of example, processor(s) 102 and/or models 112 and 114 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, NeRF (neural radiance field) models, predictive image rendering models, and/or other similar models.

As will be described in more detail, the processor(s) 102 and/or models 112 and 114 may be configured to execute instructions 106 stored within storage 104 to perform certain actions associated with associated with facilitating remote visual communication. For instance, such actions may be associated with training a holodouble of a user (e.g., via processor(s) 102 and/or holodouble training model 112) or using sparse data or parameters to configure a holodouble to simulate a user (e.g., via processor(s) 102 and/or holodouble rendering model 114).

In addition, the processor(s) 102 and/or models 112 and 114 may be configured to perform actions associated with training or configuring the models 112 and 114 to perform any functionality described herein. The actions performable by the processor(s) 102 and/or models 112 and 114 may at least partially rely on various types of data 108. For instance, any of the models 112 and 114 described herein may be trained to create or render holodoubles using various types of training data (e.g., data mapping facial landmarks, audio data, rendering parameters, and/or motion data to ground truth facial appearances) and using various types of training techniques (e.g., fully supervised, weakly supervised, and/or unsupervised).

Furthermore, in some instances, at least some data 108 comprises sensor data (e.g., image data, audio data, motion data, etc.) obtained via sensor(s) 110, or other data obtained based on sensor data (e.g., holodouble rendering parameters). Sensor(s) 110 may comprise any device for capturing or measuring data representative of perceivable phenomenon. By way of non-limiting example, the sensor(s) 110 may comprise one or more image sensors, microphones, thermometers, barometers, magnetometers, accelerometers, gyroscopes, and/or others.

In some instances, the actions performable using the processor(s) 102 and/or models 112 and 114 may rely at least in part on communication system(s) 116 for receiving data from remote system(s) 120 which may include, for example, one or more separate systems or computing devices, sensors, and/or others. The communications system(s) 118 may comprise any combination of software or hardware components that are operable to facilitate communication between on-system components/devices and/or with off-system components/devices. For example, the communications system(s) 118 may comprise ports, buses, or other physical connection apparatuses for communicating with other devices/components. Additionally, or alternatively, the communications system(s) 118 may comprise systems/components operable to communicate wirelessly with external systems and/or devices through any suitable communication channel(s), such as, by way of non-limiting example, Bluetooth, ultra-wideband, WLAN, Wi-Fi, infrared communication, and/or others. For example, implementations of the present disclosure may be practiced using cloud computing.

As shown, FIG. 1 also illustrates that system 100 may comprise or be in communication with I/O system(s) 116. I/O system(s) 116 may include any type of input or output device such as, by way of non-limiting example, a touch screen, a mouse, a keyboard, a controller, and/or others, without limitation.

Example Techniques for Facilitating Remote Visual Communication

Figure 2A:
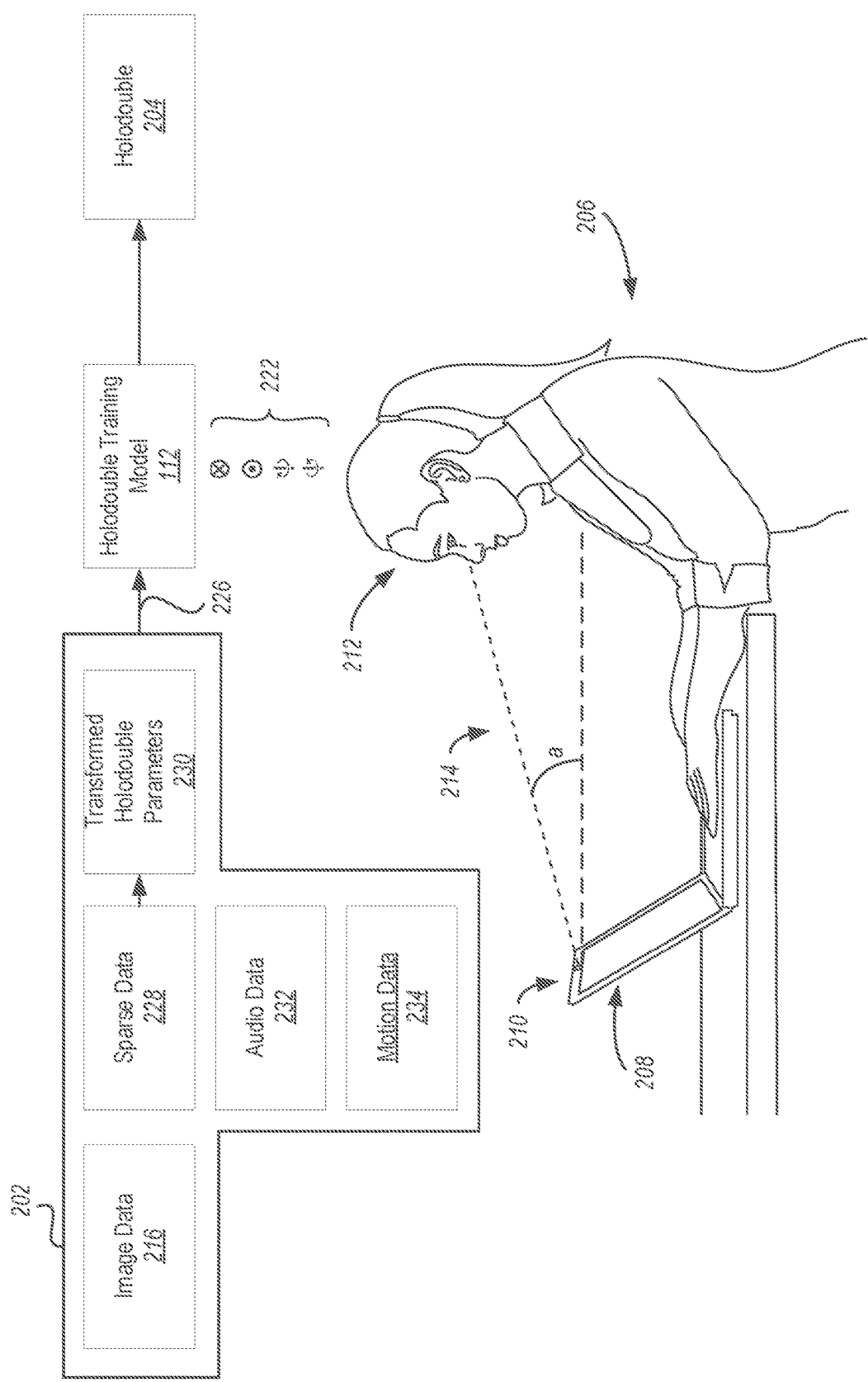
FIG. 2A illustrates a conceptual representation of capturing data for generating a holodouble of a user.

Attention is now directed to FIG. 2A, illustrates a conceptual representation of obtaining data 202 for generating a holodouble 204 of a user 206. In particular, FIG. 2A illustrates a user device 208 that includes a camera 210 for capturing images the user 206 (e.g., in the form of image frames of a video signal). The user device corresponds, in at least some respects to the system 100 described hereinabove (e.g., the user device 208 may comprise or be in communication with any number of additional devices/systems), and the camera 210 may comprise a sensor 110 of the system 100. Although FIG. 2A depicts the user device 208 in the form of a laptop, one will appreciate, in view of the present disclosure, that a user device 208 may take on any suitable form, such as a desktop computer, mobile electronic device (e.g., smartphone, tablet, etc.), head-mounted display (e.g., a virtual or augmented reality HMD), and/or others.

In some instances, the user device 208 receives an input to initiate a process of generating a holodouble 204 of the user. As used herein, a "holodouble" refers to a photorealistic three-dimensional (3D) representation or synthesizing of a user that can be controlled via input data or parameters to simulate the user. For example, where input data or parameters describe the state of a user's face (e.g., mouth shape, nose position, whether eyes are open or closed, etc.), the input data or parameters may be used to configure the holodouble to depict the facial state represented in the input data or parameters. As will be described in more detail herein, a holodouble may advantageously be used to facilitate visual remote communication between users without transmitting captured image data between the users (e.g., thereby allowing for low-bandwidth remote visual communication).

FIG. 2A shows the camera 210 directed toward the face 212 of the user 206 to capture the face 212 of the user 206 from a particular perspective, depicted in FIG. 2A by dashed line 214. For example, the camera 210 is positioned at a particular distance from the face 212 of the user (shown by the dashed line 214) and is oriented upward toward the user's face according to a particular angle a. Although FIG. 2A only explicitly shows a camera 210 on the user device 208, it should be noted that a user device 208 may comprise any number of additional or alternative sensors for capturing data associated with the user, such as a microphone for capturing audio data associated with the user and/or an inertial measurement unit (IMU) for capturing motion data associated with the user.

FIG. 2A shows an example of what may be regarded, for illustrative purposes only, as preferred imaging conditions. For instance, the camera 210 may be situated to capture the user's entire face from a perspective and distance that the user 206 regards as desirable for video conferencing for business purposes. Other aspects such as user attire and/or environmental lighting may contribute to the classification of the example imaging conditions shown in FIG. 2A as a preferred.

Figure 2B:
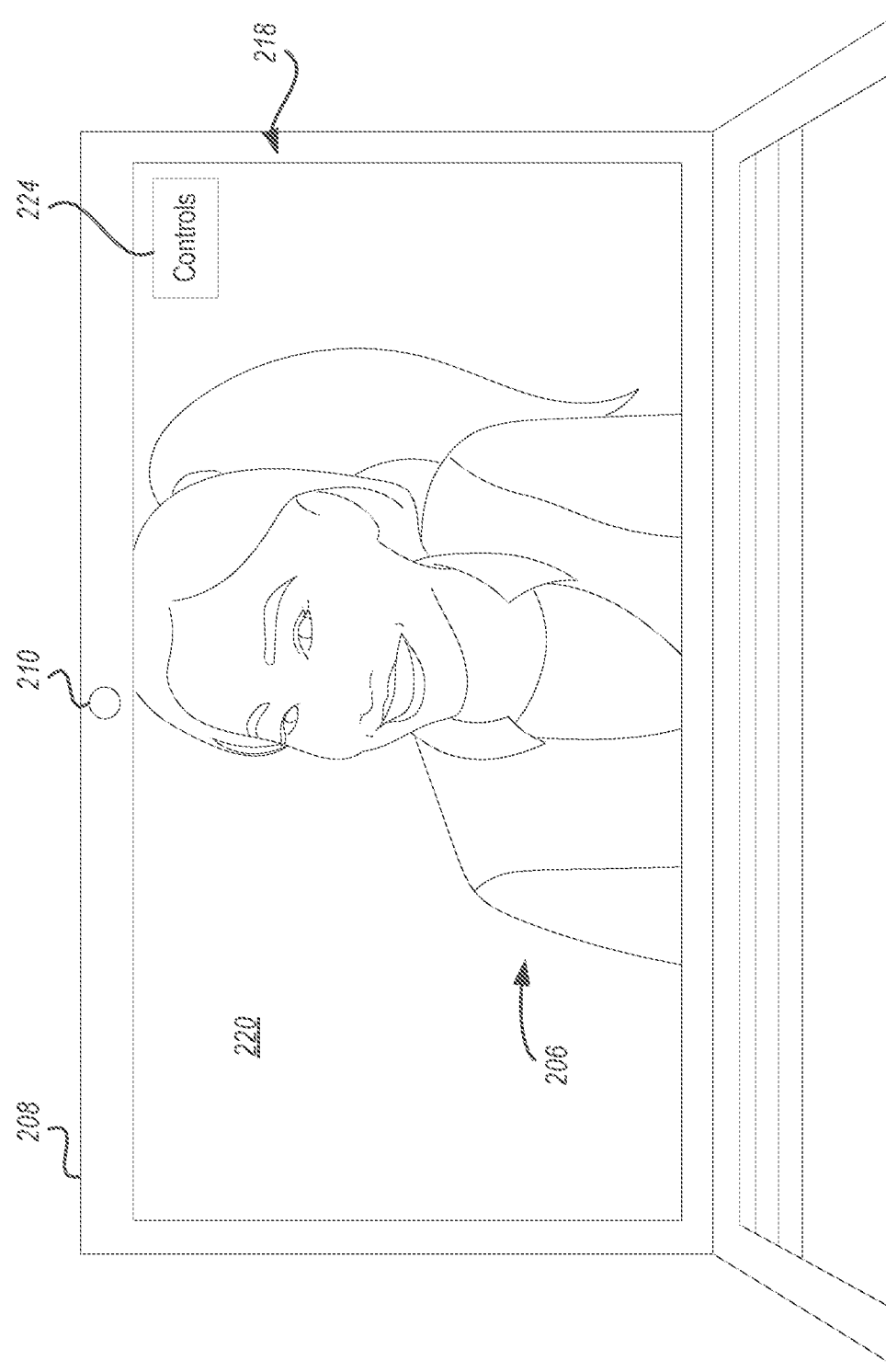
FIG. 2B illustrates an example of image data captured of the user from FIG. 2A.

From the preferred imaging conditions shown in FIG. 2A, the user device 208 captures image data 216 via the camera 210. In some instances, the image data 216 includes image frames of a video signal capturing the face 212 of the user 206. For example, FIG. 2B illustrates an example image frame 218 captured by the camera 210 of the user device 208. The image frame 218 captures the user 206 and an environment surrounding the user 220. The image frame 218 of FIG. 2B shows the user 206 with a different facial expression and positioning relative to that shown in FIG. 2A, and FIG. 2A illustrates various directional indicators 222 arranged above the head of the user 206. In this way, FIGS. 2A and 2B illustrate that the user may change facial expressions and/or head positioning during capture of the image data 216, allowing the image data 216 to include representations of the user 206 from multiple relative perspectives.

As will be described in more detail herein, the image data 216 may be used to create the holodouble 204 of the user 206 under the preferred imaging conditions such that data capturing the user under different imaging conditions may be used in conjunction with the holodouble 204 to depict the user according to the preferred imaging conditions.

FIG. 2B also illustrates that the user device 208 is, in some instances, configurable to present user controls 224 for selection by a user (e.g., user 206). For example, in some instances, the user device 208 receives user input via the controls 224 for initiating a process of generating a holodouble 204 of the user 206. The controls may be presented within the interface of a visual communication application UI, for example.

The user input may trigger capturing of image data 216 for generating the holodouble 204. For example, the user device 208 may begin capturing image data 216 (and/or other data) of the user 206 as part of a guided process where the user 206 is prompted to assume certain head motions or positions and/or facial expressions (e.g., by being directed to read particular sets of words) during capture of the image data 216.

Although the controls 224 are conceptually represented as a single button in FIG. 2B, controls 224 may take on any form and comprise any number of elements.

In some instances, at least some of the image data 216 is captured passively. For example, image data 216 may be captured pursuant to one or more image capture operations that are performed on the user device 208 for a purpose independent of generating a holodouble 204 (e.g., participating in video conferencing under conventional techniques that include transmitting image frames to other devices). In this regard, the user device 208 may receive user input via the controls 224 for configuring the system to use passively obtained image data 216 for generating a holodouble 204.

Various types and/or amounts of image data 216 for creating a holodouble 204 are within the scope of the present disclosure. For example, in some instances, a holodouble 204 may be generated based on a single picture of a user, whereas in other instances, a holodouble 204 is generated using a plurality of image frames of a user 206. In some implementations, a system (e.g., user device 208) is configured to cease collecting image data 216 based on a determination that sufficient image data 216 has been captured to successfully generate a holodouble 204 of a user 206 (e.g., enough image data 216 to synthesize the user 206 in a 3D and in a photorealistic manner). In some instances, the user device 208 provides a notification when sufficient image data 216 has been captured.

FIG. 2A illustrates arrow 226 extending from the data 202 to the holodouble training model 112. The holodouble training model 112 is configured to generate the holodouble 204 based at least on the image data 216. In some implementations, the holodouble training model 112 is a machine learning (or machine learned) model that has been trained using image data of humans captured from one or more first sets of perspectives to generate 2D or 3D simulations of the humans from different or additional perspectives (e.g., by generating a volumetric representation of the captured portion of the human, such as via neural radiance field imaging and/or other view synthesis technique).

In this regard, the holodouble 204 generated by the holodouble training model 112 may be regarded as a volumetric representation of at least a portion of the captured user 206 that is enabled to provide synthesized views of the user 206 (e.g., views of the user's face and/or head) from multiple perspectives (e.g., including perspectives used during generation of the holodouble 204 as well as different or additional perspectives). For example, the holodouble 204 may be parameterized to receive input values (e.g., location, view direction, and/or others) and provide RGB and/or volume density values for volume rendering of the synthesized views.

In some implementations, the holodouble training model 112 uses additional or alternative inputs for training the holodouble 204 to provide synthesized, photorealistic views of the user 206 based on input parameters and/or input data. For example, the data 202 in FIG. 2A is illustrated as including sparse data 228, transformed holodouble parameters 230, audio data 232, and motion data 234.

The sparse data 228 comprises data that is extracted from or determined based on the image data 216. Sparse data 228 may identify or describe one or more attributes of the user 206 represented within the image data 216. For instance, the sparse data 228 may include facial landmarks of the user 206. Additional details concerning the sparse data 228 will be provided hereinafter with reference to FIG. 4B.

The transformed holodouble parameters 230 include components that are determined based on the sparse data 228 and comprise sets of numbers or other values that are usable to configure a holodouble 204 to synthesize the user 206. Transformed holodouble parameters 230 may comprise numbers describing environmental lighting, facial details (e.g., whether and/or how the user is smiling, frowning, opening their mouth), head positioning, viewing angle, and/or other information for forming a reconstruction of the user 206 using the holodouble 204. Additional details concerning the sparse data 228 will be provided hereinafter with reference to FIG. 4B.

In some implementations, the transformed holodouble parameters 230 include components that are not determined based on the sparse data 228, or (alternatively) that supplement the sparse data 228. For instance, the transformed holodouble parameters 230 may be inferred or determined based on audio data 232 and/or motion data 234 (in addition or as an alternative to image data 216).

By way of example, during training of a holodouble 204, the user device 208 may obtain audio data 232 as the user 206 speaks and/or motion data 234 as the user 206 speaks (e.g., where the user device is implemented as a head-mounted display (HMD), an IMU of the HMD may capture head motion data). The audio data 232 and/or the motion data 234 may be used as training input and the image data 216, sparse data 228, transformed holodouble parameters 230, and/or holodouble synthesized view output may be used as ground truth to configure the holodouble 204 via the training to synthesize the user 206 using audio data 232 and/or motion data 234 as inputs. For example, transformed holodouble parameters 230 may be inferred from the audio data 232 and/or the motion data 234, and the transformed holodouble parameters 230 may be used to cause the holodouble 204 to visually simulate the user's speech (e.g., by inferring mouth shape based on audio signal, by inferring head position based on IMU data, etc.). Such functionality may be useful during video conferencing sessions where image data 216 of the user 206 for providing sparse data 228 or transformed holodouble parameters 230 is unavailable or undesirable (e.g., in view of capture conditions or for other reasons).

Although the examples discussed with reference to FIGS. 2A and 2B arbitrarily focus on what is referred to herein as "preferred" imaging conditions for illustrative purposes, one will appreciate, in view of the present disclosure, that a user may create one or more holodoubles under a variety of imaging conditions and/or for a variety of purposes. For example, a user may create a first holodouble within a first imaging context (e.g., capture perspective, environment, dress, grooming, or other conditions) for use in a first remote communication context (e.g., when conversing with certain people or conversing about certain subject matter), and the user may create a second holodouble within a second imaging context for use in a second remote communication context (e.g., when conversing with different people or conversing about different subject matter).

FIGS. 2A and 2B are associated with capturing image data 216 for generating the holodouble 204 of the user 206. The data 202 may be used to train the holodouble 204 as discussed above, and, after completing the training of the holodouble 204, a preview of the holodouble 204 may be provided to the user 206 to allow the user 206 to accept the holodouble 204 for use in remote visual communication sessions. This is generally referred to as an interactive enrollment process of enrolling/creating holodouble(s) that are determined to be acceptable to a user to be used in subsequent simulations of the user in visual communications.

Figure 3A:
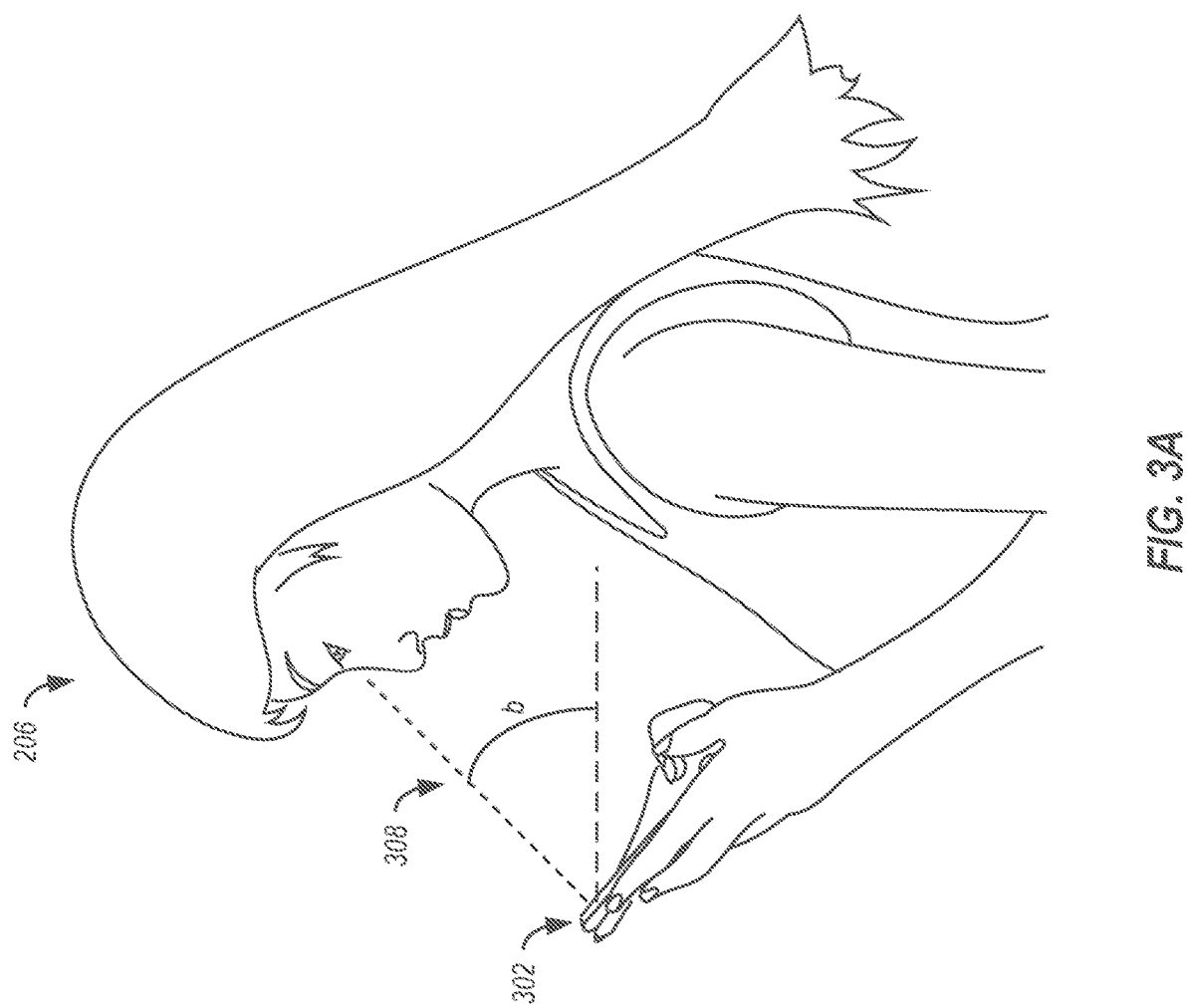
FIG. 3A illustrates an example of a user operating a mobile electronic device.
Figure 3B:
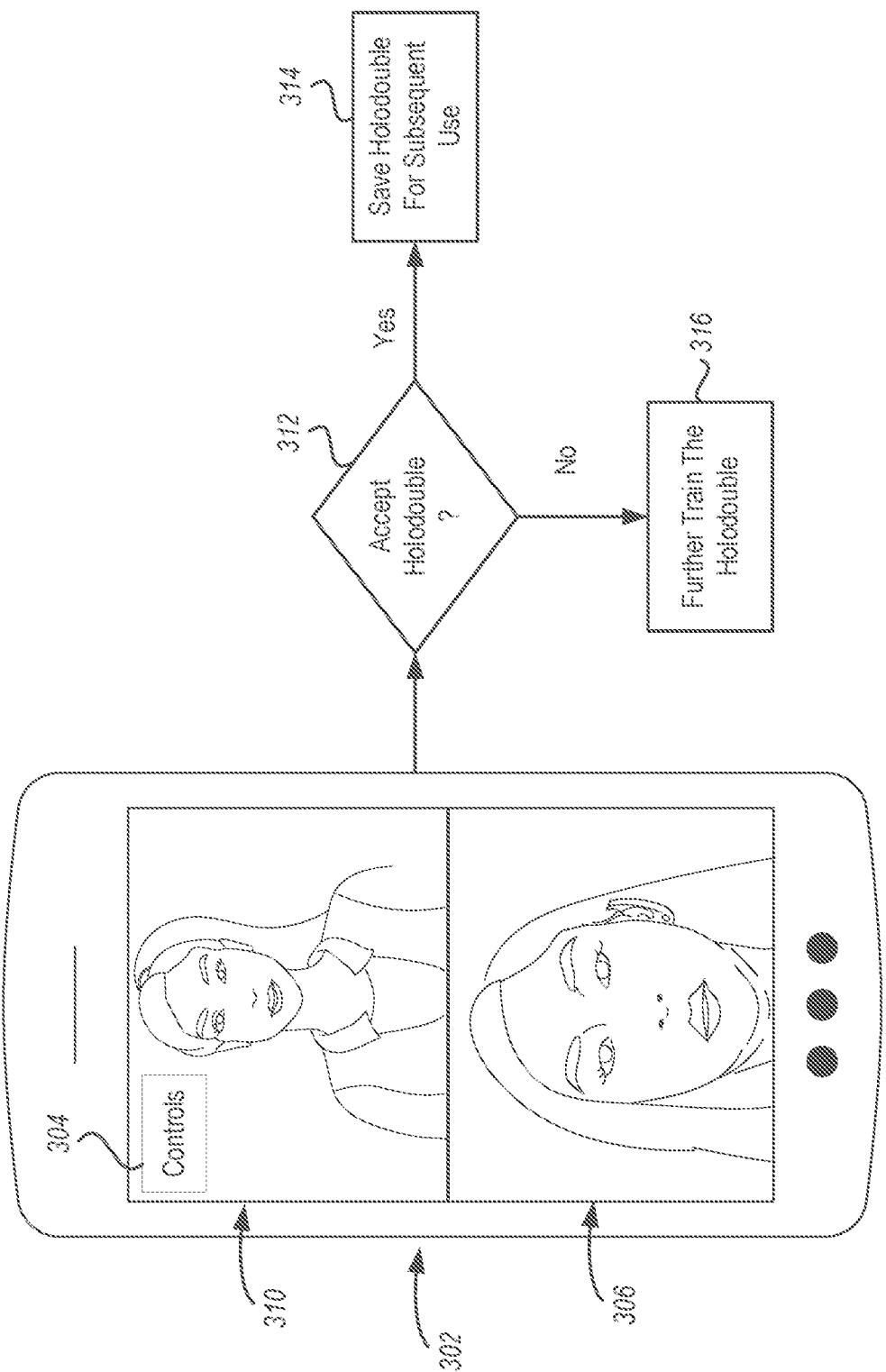
FIG. 3B illustrates an example of the mobile electronic device of FIG. 3A displaying images captured of the user of FIG. 3A and displaying a holodouble of the user.

FIG. 3A illustrates the user 206 from FIGS. 2A and 2B, but at a subsequent timepoint. For example, FIG. 3A depicts the user 206 operating a mobile electronic device 302 after training of the holodouble 204 has been completed. In some instances, after completion of the training of the holodouble 204, a notification is provided to the user 206 that their holodouble 204 is ready for review. The user 206 may provide user input (e.g., via controls 304 as shown in FIG. 3B) for initiating a preview of the holodouble 204.

To provide a preview of the holodouble 204, the mobile electronic device 302 may begin capturing image frames of the user 206. FIG. 3B illustrates an example of the mobile electronic device 302 displaying an image frame 306 captured of the user 206. As is evident from FIGS. 3A and 3B, the user 206 is wearing different attire than the clothing depicted on the user 206 in FIGS. 2A and 2B for the training of the holodouble 204. For example, the clothing depicted on the user 206 in FIGS. 3A and 3B may be regarded as casual attire, whereas the clothing depicted on the user 206 in FIGS. 2A and 2B may be regarded as professional attire. Furthermore, FIGS. 3A and 3B depict the user 206 with a different hairstyle relative to FIGS. 2A and 2B. Still furthermore, FIG. 3A shows the camera of the mobile electronic device 302 directed toward the face of the user 206 from a different perspective (indicated by dashed line 308) relative to the perspective shown in FIG. 2A (indicated by dashed line 214). For example, the camera of the mobile electronic device 302 in FIG. 3A is positioned at a different distance from the face of the user 206 than the camera 210 of the user device 208 of FIG. 2A, and the camera of the mobile electronic device 302 is oriented upward toward the user's face according to an angle b, which is greater than the angle a depicted in FIG. 2A. These differences are evident in image frame 306 of the user 206 of FIG. 3B, which shows the user from a closer perspective and different angle as compared with the image frame 218 of the user 206 of FIG. 2B.

Accordingly, FIG. 3A represents different imaging conditions for capture of the user 206 relative to the "preferred" imaging conditions described with reference to FIGS. 2A and 2B for the generating of the holodouble 204. Notwithstanding the different in imaging conditions of FIG. 3A, image frames captured of the user 206 as represented in FIG. 3A may be used as a basis for using the holodouble 204 to simulate the user 206 in a photorealistic manner and from the preferred imaging conditions of FIGS. 2A and 2B.

In one example, referring again to FIG. 3B, sparse data (e.g., facial landmarks) are obtained based on the image frame 306. The sparse data are used as input to a function for generating holodouble parameters (e.g., facial details/shape/position), and the holodouble parameters are used as inputs for configuring the holodouble 204 to simulate the facial features of the user 206 as captured in the image frame 306, but from the preferred imaging conditions that existed at the time of capturing the image data 216 for generating the holodouble 204 (as described with reference to FIG. 2A).

For instance, FIG. 3B illustrates a holodouble representation 310 of the user 206, which simulates the facial features of the user 206 as captured in the image frame 306. The holodouble representation 310 simulates the arrangement and shape of the mouth, eyes, eyebrows, and nose of the user 206 as captured within the image frame 306. Furthermore, the holodouble representation 310 simulates these features of the user's face as though they were captured under the imaging conditions that were present for the generating of the holodouble 204. For example, the holodouble representation 310 simulates the user 206 from a further and differently angled viewing perspective as compared to the viewing perspective of the camera of the mobile electronic device 302 capturing the image frame 306 of the user 206.

The holodouble representation 310 also portrays the user 206 with the same hairstyle and clothing that existed under the preferred imaging conditions that existed during the generation of the holodouble, even though the image frame 306 captures the user 206 with a different hairstyle and clothing.

FIG. 3B shows the mobile electronic device 302 displaying a rendering of the holodouble representation 310 concurrently with capturing and/or displaying image frames of the user (e.g., image frame 306). The user 206 may thus observe the holodouble representation 310 of themselves and how it simulates their facial features and expressions as captured in a video feed. In some implementations, a user prompt is provided (e.g., via controls 304) that allows the user to accept or reject the holodouble representation 310 of the user (e.g., represented in FIG. 3B by the decision block 312). If input is detected (e.g., via controls 304) that approves of the holodouble, the training of the holodouble 204 may be completed by saving the holodouble 204 for subsequent use to simulate the user at remote devices in remote visual communication sessions in a low-bandwidth manner (depicted in FIG. 3B by block 314).

Conversely, if input is detected (e.g., via controls 304) that indicates that the holodouble representation 310 fails to provide a satisfactory simulation of the user, the holodouble may be further trained (depicted in FIG. 3B by block 316). For example, in response to such input rejecting the holodouble representation 310, additional image data may be obtained of the user (e.g., under preferred imaging conditions) to further train the holodouble to improve its accuracy in providing a photorealistic simulation of the user using data captured under different conditions.

Although FIGS. 3A and 3B illustrate the use of a mobile electronic device 302 that is different from the user device 208 that captured the image data 216 for initially training the holodouble 204, one will appreciate, in view of the present disclosure, that the same device may be used in both instances, and that other types of devices than those shown may be used in accordance with the present disclosure (e.g., desktop computers, tablets, HMDs, and/or others without limitation).

FIGS. 4A-4E illustrate conceptual representations of facilitating remote visual communication using a holodouble 204 that has been trained as described above. In particular, FIGS. 4A-4E illustrate a remote visual communication session 400 initiated between the user 206 and a viewing user 402. The remote visual communication session 400 may be initiated in response to user input from both users to establish and/or participate in the remote visual communication session 400. In the example shown in FIGS. 4A-4E, the mobile electronic device 302 of the user 206 includes a camera, and the mobile electronic device 404 of the viewing user 402 includes at least a display for displaying images associated with the remote visual communication session 400 (e.g., representations of the user 206). As with other devices described herein, the mobile electronic device 404 of the viewing user 402 may take on any suitable form.

Figure 4A:
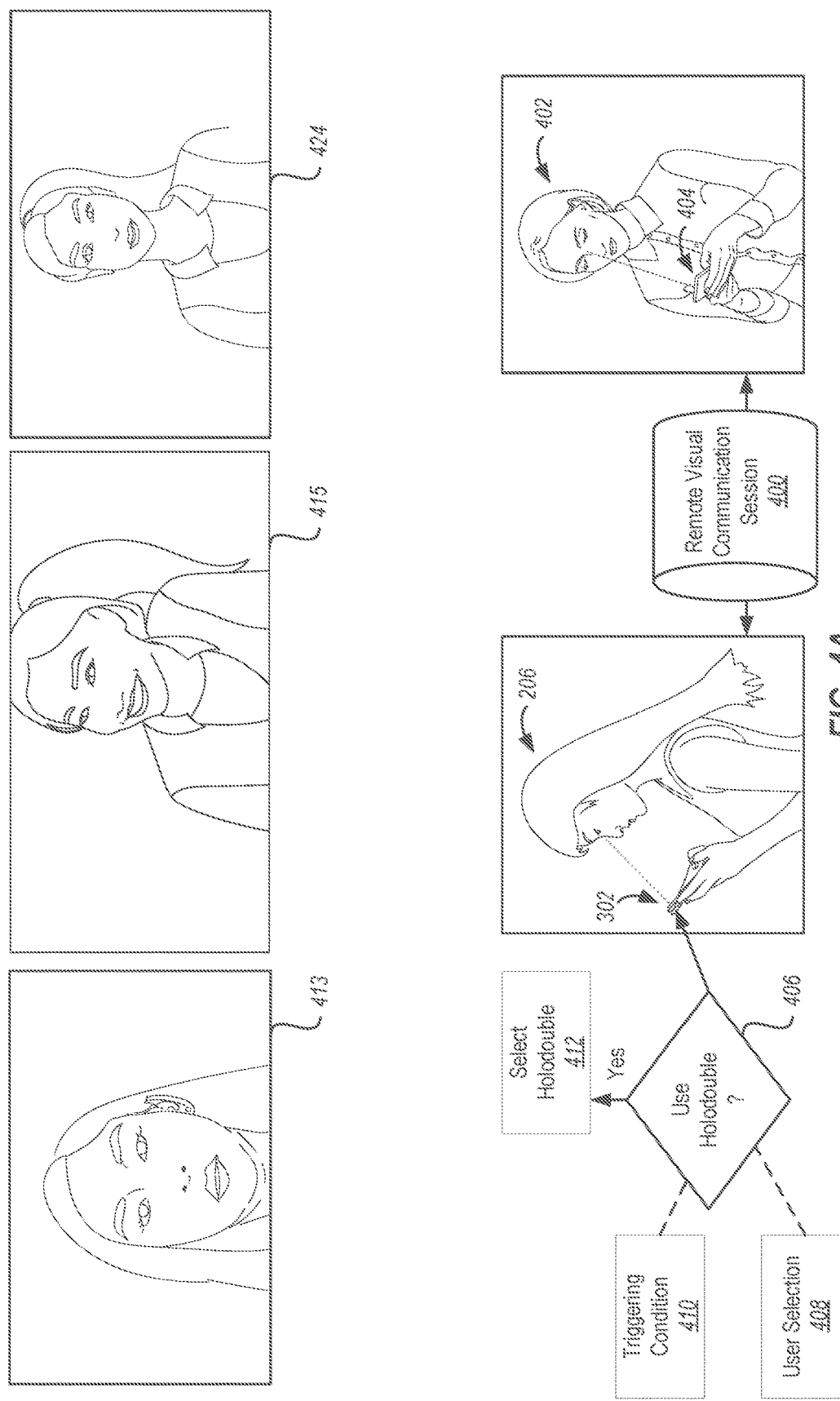
FIGS. 4A-4E illustrate conceptual representations of facilitating remote visual communication using a holodouble.

In some instances, one or more systems facilitating the remote visual communication session 400 detect an input indicating that a holodouble should be used to simulate one or more of the participants in the remote visual communication system (indicated in FIG. 4A by decision block 406). In some instances, the input for indicating that one or more holodoubles should be used includes detecting a user selection 408 for causing use of a holodouble to simulate a user (rather than directly transmitting image data for viewing on other devices). In some instances, the input for indicating that one or more holodoubles should be used includes detecting the presence of a triggering condition 410. A triggering condition may comprise a detection that image frames are unavailable or are undesirable (e.g., in view of unfavorable imaging conditions, such as low light or camera shaking) or a detection that bandwidth availability is low or changing. In some instances, a triggering condition 410 includes a detection that user-defined preferences or settings indicate the use of a holodouble (e.g., based on the participating users, historic use, etc.). A triggering condition 410 may be based on user attributes detected within image data associated with a captured user. For example, based on a determination that a user is in a disheveled state (e.g., being unshaven or informally dressed), a system may automatically trigger the use of a holodouble to simulate the user for display at other participating devices.

In response to determining that a holodouble should be used to depict the user 206 for presentation on the mobile electronic device 404 of the viewing user 402, a particular holodouble (e.g., holodouble 204) may be selected to facilitate the depiction of the user 206 (indicated in FIG. 4A by block 412. As indicated above, a user may define a plurality of holodoubles in different contexts and/or for different purposes. Accordingly, the particular holodouble to use for depicting the user 206 in the remote visual communication session 400 may be selected from among a plurality of holodoubles defined for the user 206. In some instances, the particular holodouble is explicitly selected or chosen by the user 206 via user input from the user 206 (e.g., subsequent to initiation of the remote visual communication session 400 or as a configuration setting for initiating the remote visual communication session 400). In some instances, the particular holodouble is automatically selected without explicit instructions from the user 206 (e.g., based on historic use of holodoubles by the user 206, based on a user state determined from newly captured image data of the user, etc.).

By way of overview, FIG. 4A also shows an example of an image frame 413 that may be captured by a camera of the mobile electronic device 302 of the user 206 in response to determining to use a holodouble (e.g., according to decision block 406). FIG. 4A also shows an example depiction 415 of the holodouble 204 that may be selected for use in the remote visual communication session 400 (e.g., according to block 412). FIG. 4A also illustrates an example holodouble representation 424 of the user 206 that may be synthesized based on data generated from the image frames 413. As is evident from FIG. 4A, the holodouble representation 424 provides a view of the user 206 from a viewing perspective and within a context (e.g., user clothing, grooming conditions, etc.) that is different than the viewing perspective and context associated with the image frame 413. As will be described in more detail hereinafter, image frames 413 of the user 206 may provide a basis for causing the holodouble 204 to simulate the holodouble representation 424 at the mobile electronic device 404 of the viewing user 402, even when the image frames 413 are not transmitted to the mobile electronic device 404 of the viewing user 402.

Figure 4B:
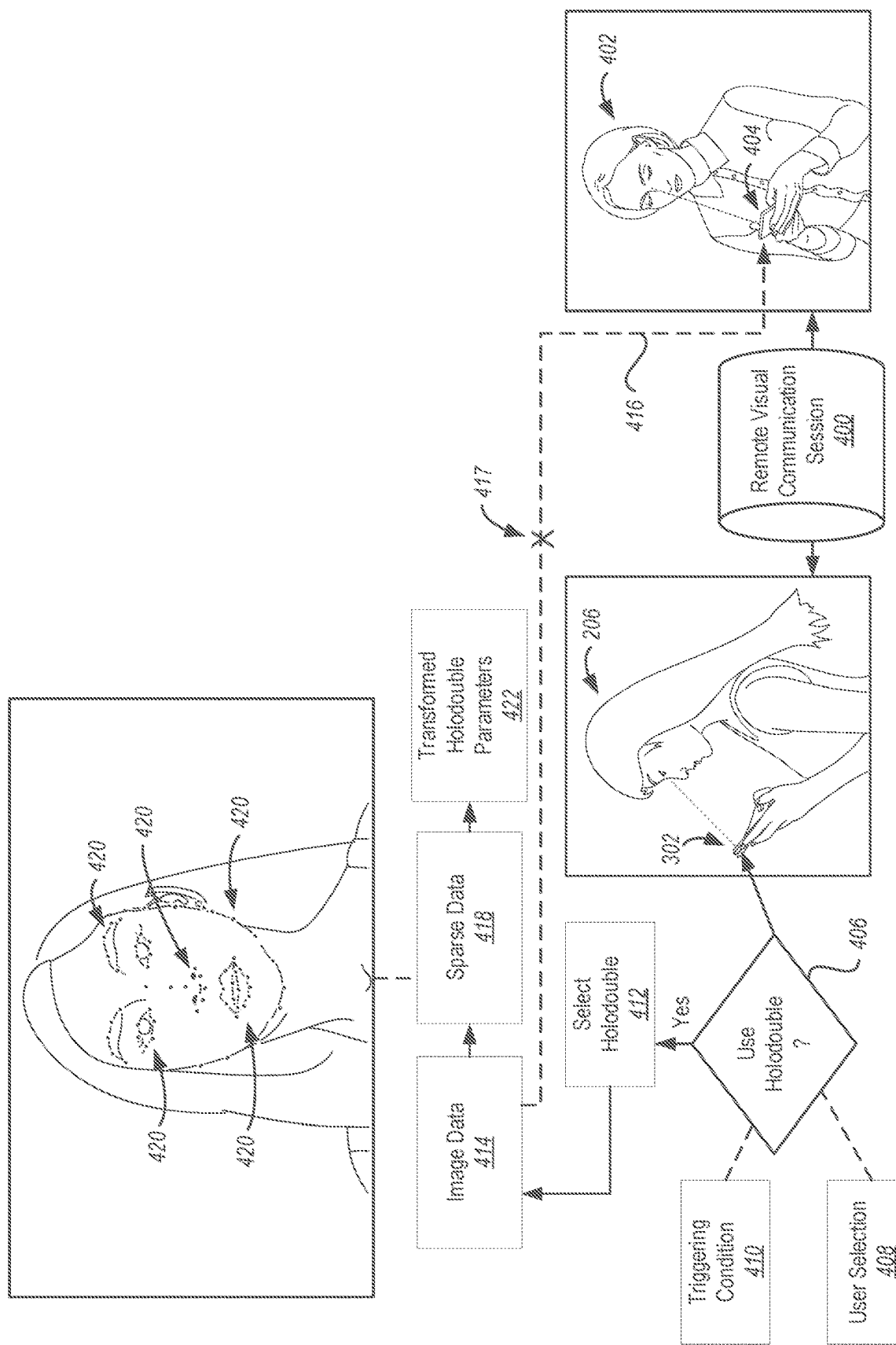

FIG. 4B illustrates that a system acquires image data 414 of the user 206 after determining to use a holodouble to depict the user 206 during the remote visual communication session 400. In the example shown in FIGS. 4A-4E, the image data 414 is acquired via a camera of the mobile electronic device 302 of the user 206. Based on the determination that a holodouble will be used to represent the user 206 for the remote visual communication session 400, systems may refrain from transmitting the image data 414 to the mobile electronic device 404 of the viewing user 402 for display to the viewing user 402 (indicated in FIG. 4B by dashed line 416 with an "X" symbol 417 placed thereover). In some implementations, instead of transmitting the image data 414, the system transmits sparse data 418, transformed holodouble parameters 422, and/or other components to the mobile electronic device 404 of the viewing user 402 (or to another system/device for processing) to generate a holodouble representation 424 of the user 206 for viewing by the viewing user 402.

FIG. 4B also illustrates sparse data 418, which may be obtained based on the image data 414. The sparse data 418 identifies one or more attributes of the user and may be obtained by deconstructing the image data 414 of the user 206. For example, in some implementations, sparse data 418 includes facial landmarks 420, which may comprise features extracted from the image data 414 associated with key portions of a human face. For example, FIG. 4B illustrates facial landmarks 420 (represented as dots) associated with key portions of the eyes, nose, mouth, eyebrows, and facial outline of the user 206.

The system may automatically identify a threshold quantity of landmarks or image anchor points to obtain for a user (e.g., facial landmarks 420), corresponding to threshold requirements for predictive image modeling. This threshold of image landmarks to identify/obtain from an image may be less than 1.0% of the total image data, or less than 0.01% of the total image data, or even less than 0.001% of the image data. In some instances, the system determines the type and quantity of sparse data 418 to obtain based on detected environmental (e.g., lighting) and/or image quality conditions. For instance, a quantity of landmark(s)/landmark data may be based on detected image quality, such that less landmark data is required for higher quality/resolution captured images or images captured with better lighting/contrast, and more landmark data is required for lower quality/resolution captured images or images with relatively inferior lighting/contrast.

After determining the type and quantity of sparse data to obtain, the system obtains the requisite sparse data. The sparse data may be obtained on a frame-by-frame basis for each image/frame obtained, such as for a video that contains multiple frames. Alternatively, the sparse data may be obtained for less than each frame, and for predetermined sets of image frames. The frequency for obtaining the sparse data, relative to video frame rate, may be fixed and/or dynamically variable based on detected attributes of the environment and/or movement of the user within the environment.

FIG. 4B also illustrates transformed holodouble parameters 422, which may be obtained based at least in part on the sparse data 418. For example, the transformed holodouble parameters 422 may be generated by transforming or processing the sparse data 418 (e.g., the facial landmarks 420) to form one or more sets of numbers that are usable as input for causing the holodouble 204 to be rendered to synthesize the current facial features of the user 206 (e.g., as captured by the facial landmarks 420 and as represented in the image data 414). In this regard, the transformed holodouble parameters 422 may quantify or represent various types of information for reconstructing a holodouble representation of the user 206, such as facial expression, head pose, facial element state (e.g., whether eyes are open or closed, mouth shape, etc.), camera/viewing directionality or perspective, positional and/or directional data for facial landmarks, and/or others.

Although FIGS. 4A-4E focus on transformed holodouble parameters 422 obtained based on sparse data 418 extracted from image data 414, transformed holodouble parameters 422 may, in some instances, be determined based on other data, such as audio data and/or motion data (e.g., where image data capturing the user 206 is unavailable or undesirable), as described hereinabove.

Figure 4C:
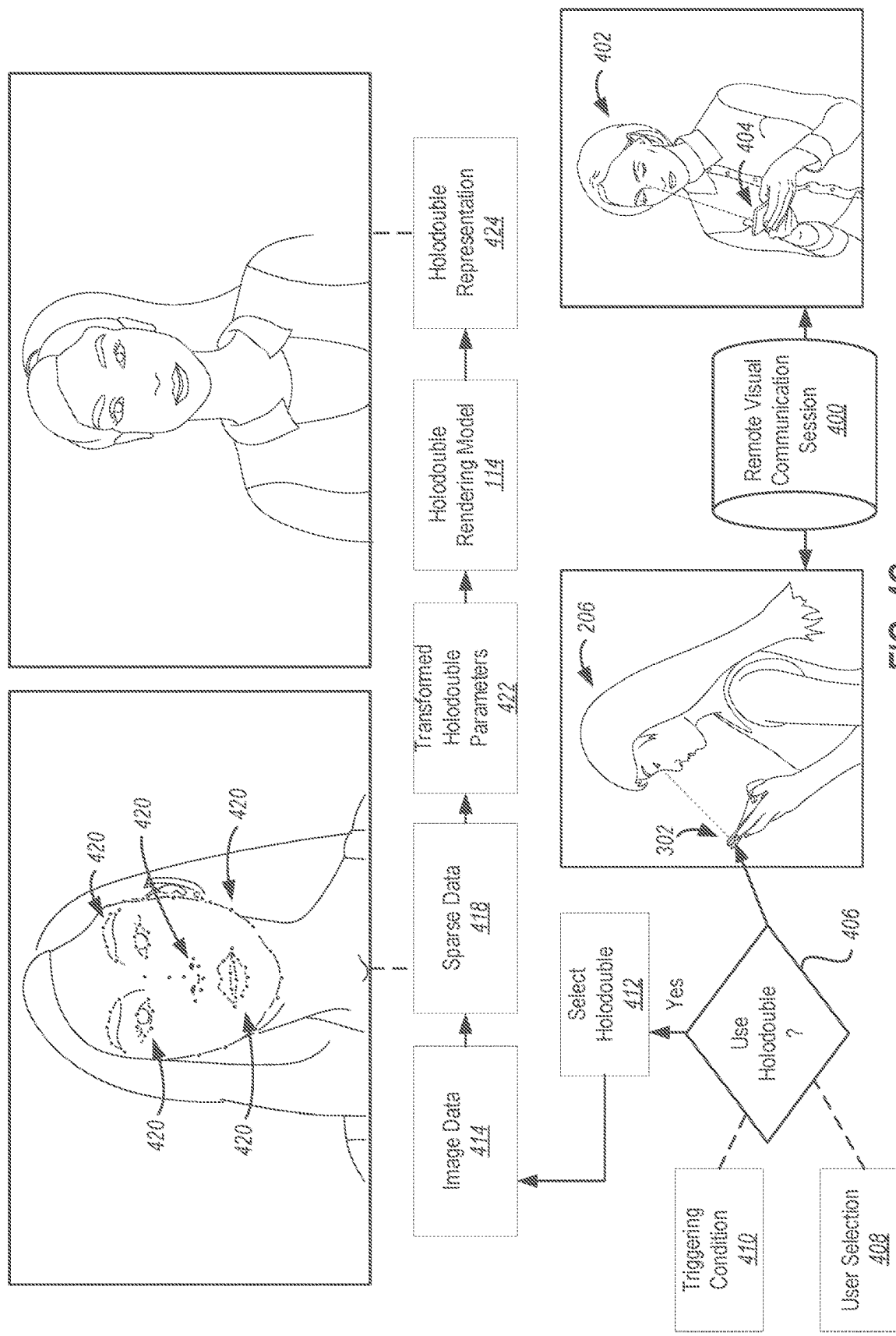

FIG. 4C illustrates that, in some implementations, the transformed holodouble parameters 422 are provided as input to a holodouble rendering model 114. In some instances, the holodouble rendering model is trained on holodouble rendering parameters (and/or image data or sparse data extracted from image data) to render photorealistic 2D or 3D representations of humans from multiple perspectives (e.g., from perspectives that are different from or additional to camera perspectives for capturing image data used to provide parameter input). For example, in some instances, the holodouble rendering model 114 includes or communicates with a parameterized vector valued function.

As is also illustrated in FIG. 4C, providing the transformed holodouble parameters 422 as inputs to the holodouble rendering model 114 generates a rendering of a holodouble representation 424 of the user that reconstructs or simulates the current facial features of the user 206 (e.g., as conceptually represented by the facial landmarks 420) as though they were captured under the imaging conditions present while training the particular holodouble used for the remote visual communication session 400 (e.g., holodouble 204). For example, the holodouble representation 424 may provide a perspective of the user 206 that is different from a perspective of the user that is represented by the image data 414 of the user 206 captured by the mobile electronic device 302 of the user.

Although the present examples focus, in at least some respects, on transformed holodouble parameters being used as inputs to a holodouble rendering model 114 for generating a holodouble representation 424, a holodouble rendering model 114 may be configured to use sparse data 418 as inputs to generate a holodouble representation 424, and/or even other types of data (IMU and/or audio data).

Although the present examples focus, in at least some respects, on utilizing sparse data or parameters based on captured image data to control a holodouble to provide photorealistic representations of users, a holodouble can be controlled using only audio data and/or motion data (e.g., where image data is unavailable or undesirable). For example, transformed holodouble parameters may be inferred or calculated from audio data and/or motion data of a user in the absence of image data of the user (e.g., using a machine learning model) in order to configure a holodouble to simulate a user.

Figure 4D:
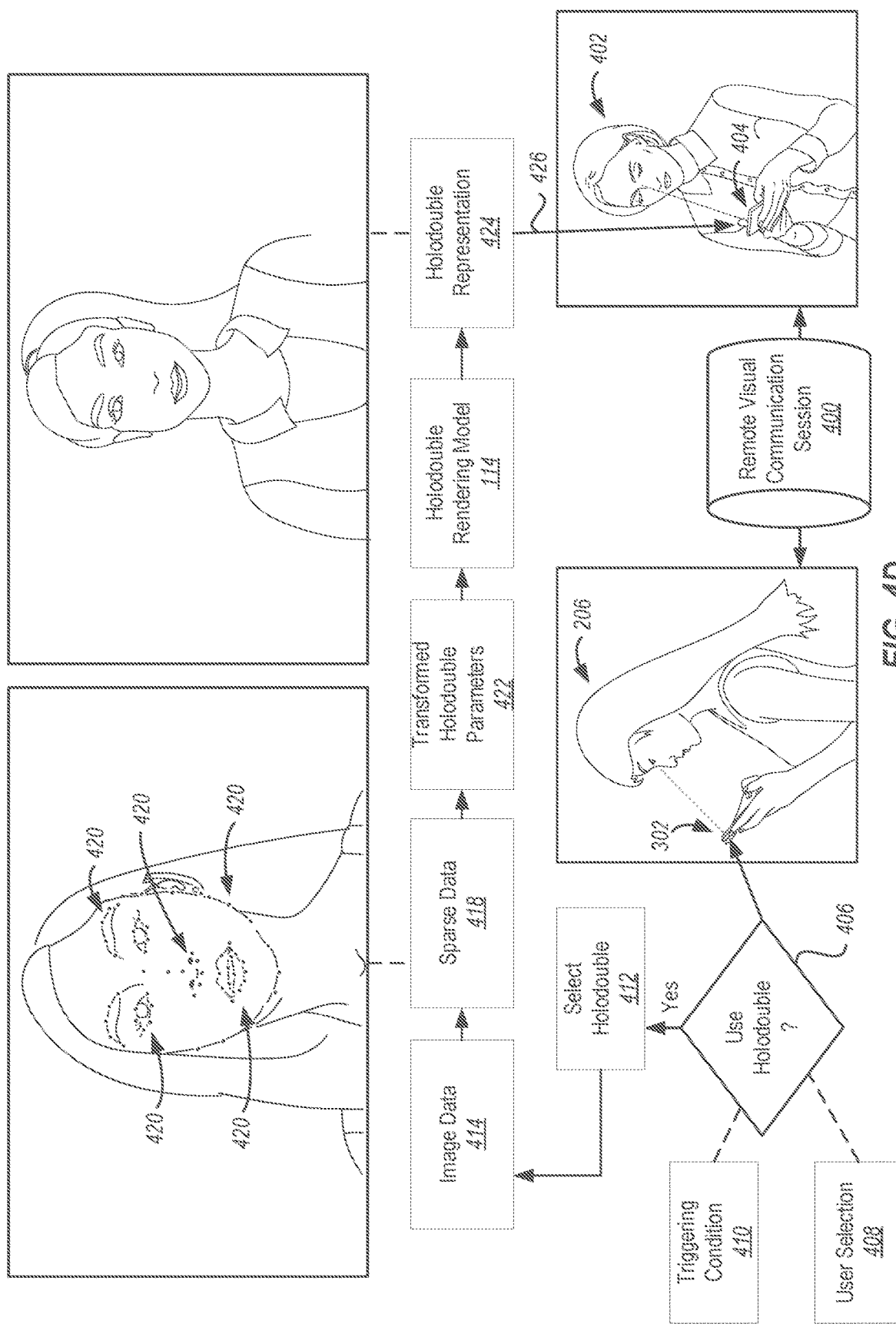

FIG. 4D illustrates that instructions for rendering and/or displaying the holodouble representation 424 may be provided to the mobile electronic device 404 of the viewing user 402 to allow the viewing user 402 to perceive visual communications from the user 206 as part of the remote visual communication session 400 (indicated in FIG. 4D by arrow 426), and the holodouble representation 424 may be continually updated based on new image data, new sparse data, and/or new transformed holodouble parameters. As indicated hereinabove, one or more systems may advantageously refrain from providing the image data 414 to the mobile electronic device 404 of the viewing user 402 to reduce the bandwidth requirements of the remote visual communication session 400. In some instances, the mobile electronic device 404 of the viewing user 402 is configured to provide a notification to the viewing user 402 when a holodouble representation 424 is used to depict the user 206 to inform the viewing user 402 that the depiction of the user 206 being presented may not reflect the actual, current, real-world appearance of the user 206. In other instances, the mobile electronic device is not configured to provide such a notification.

In some instances, instructions may be provided for applying one or more stylization filters or additional modifications (e.g., by adding or modifying facial features or other components) to the holodouble representation 424, such that the viewing user 402 perceives a stylized version of the holodouble representation 424.

Figure 4E:
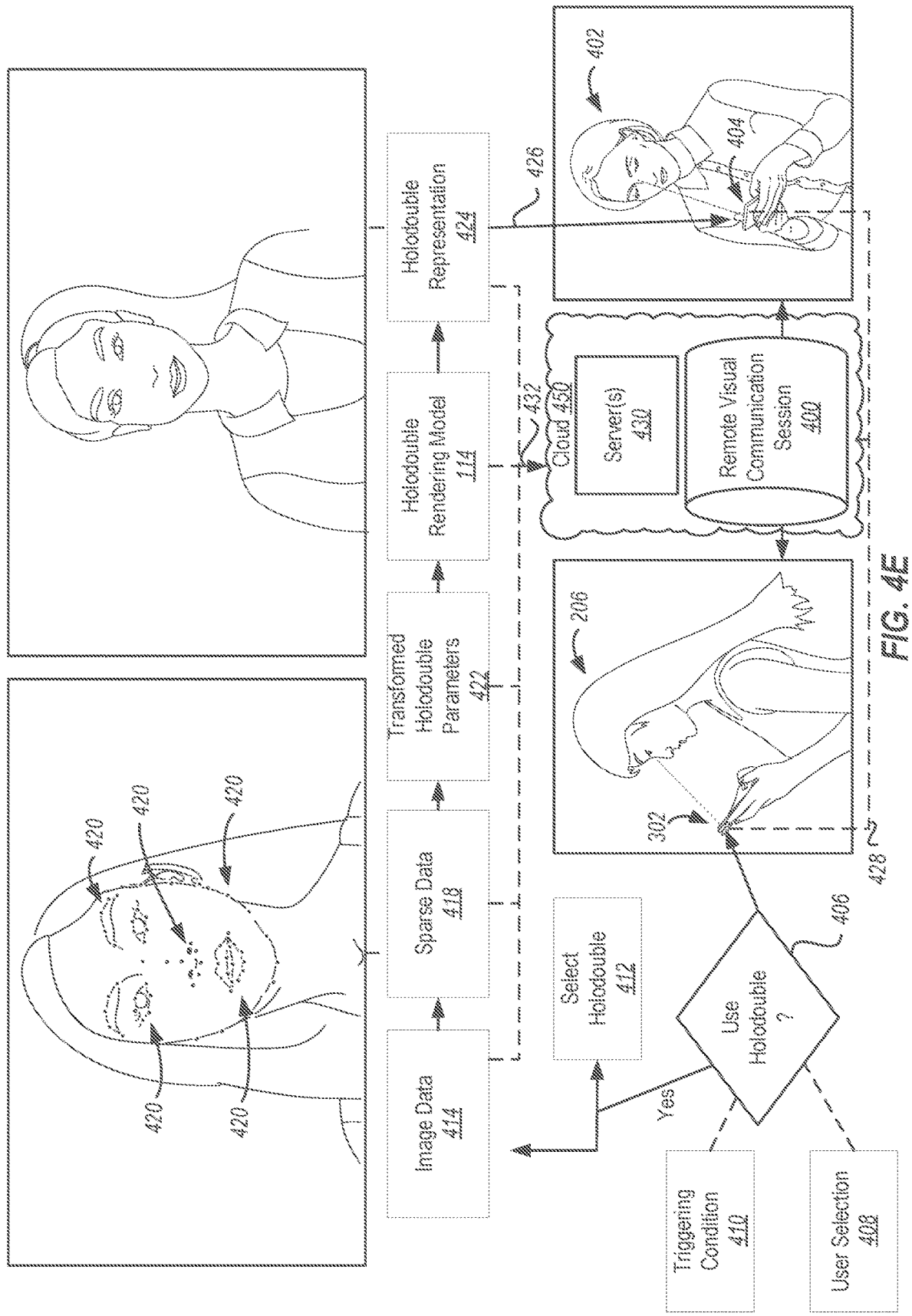

It will be appreciated, in view of the present disclosure, that the various functions or acts associated with facilitating the remote visual communication session 400 may be performed by various entities in various implementations. For example, FIG. 4E illustrates dashed arrows 432 extending from the image data 414, the sparse data 418, the transformed holodouble parameters, the holodouble rendering model 114, and the holodouble representation 424 toward a cloud 450. The cloud 450 may comprise communication channels for receiving information from and/or transmitting information to the mobile electronic devices 302, 404 of the user 206 and the viewing user 402 (as indicated in FIG. 4E by dashed lines 428 extending between the mobile electronic devices 302, 404 and the cloud 450). One will appreciate, in view of the dashed lines 428, that information may be transmitted directly from the mobile electronic device 302 to the mobile electronic device 404 and/or vice versa without first passing through the cloud 450 (e.g., via Bluetooth communication, ultrawideband, etc.).

The cloud 450 may, additionally or alternatively, comprise one or more servers 430 for performing any of the processing described herein. Such processing may, additionally or alternatively, be performed at one or more of the mobile electronic devices 302, 404. For example, in some instances, the act of extracting sparse data 418 from image data 414 is performed by the same device that captures the image data 414 (e.g., the mobile electronic device 302 of the user 206). In other instances, the image data 414 is transmitted to a server 430 (e.g., of a cloud 450, as shown in FIG. 4E) and/or other remote device(s) for extraction of the sparse data 418.

Furthermore, in some instances, the act of generating transformed holodouble parameters 422 based on sparse data 418 is performed by the same device that captures the image data 414 and/or that extracts the sparse data 418 from the image data 414 (e.g., the mobile electronic device 302 of the user 206). In other instances, the act of generating transformed holodouble parameters 422 based on sparse data 418 is performed by the server 430 and/or other remote device(s).

In some instances, the server 430 and/or other remote device(s) receive the image data 414, deconstructs the image data 414 to obtain sparse data 418, and generates the transformed holodouble parameters 422 using the sparse data 418. In other instances, the server 430 or other remote device(s) receive the sparse data 418 without receiving the image data 414 and generates the transformed holodouble parameters 422 using the received sparse data 418.

In still other instances, the act of generating transformed holodouble parameters 422 based on sparse data 418 is performed by a user device that does not capture the image data 414 (e.g., mobile electronic device 404 of the viewing user 402). In some instances, the mobile electronic device 404 may receive the transformed holodouble parameters 422 without receiving the sparse data 418.

The act of using the transformed holodouble parameters 422 (or the sparse data 418 or other received data not including the image data 414) as input to the holodouble rendering model 114 may be performed at the user device that captures the image data 414 (e.g., mobile electronic device 302), the user device that will display a holodouble representation 424 and that does not capture the image data 414 (e.g., mobile electronic device 404), and/or a server 430 or other remote device(s). For example, in some instances, a cloud system renders the holodouble representation 424 and provides images based on the holodouble representation 424 for display on the mobile electronic device 404 of the viewing user 402.

FIG. 4E shows that, in some implementations, instructions for rendering and/or displaying the holodouble representation 424 are additionally provided to the mobile electronic device 302 of the user 206 (indicated in FIG. 4E by dashed arrow 432 and dashed lines 428). In some instances, the mobile electronic device 302 of the user 206 displays the holodouble representation 424 concurrently with a representation of the image data 414 (e.g., to allow the user 206 to see how they are being perceived by the viewing user 402 during the remote visual communication session 400). Similarly, newly obtained/updated image data may be displayed concurrently with newly updated holodouble representations for viewing by the user 206.

Figure 5:
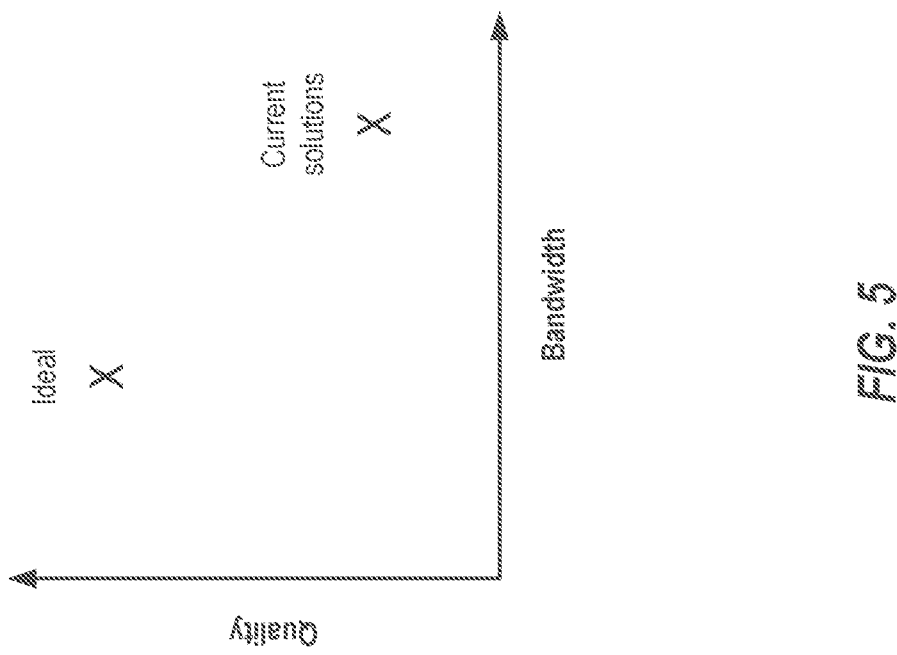
FIG. 5 illustrates an example graph.

FIG. 5 graphically depicts differences between using holodoubles for remote visual communication, as described herein, and conventional video conferencing techniques (e.g., transmitting a live video and audio feed from one device to another). As is evident from FIG. 5, current solutions are associated with high bandwidth consumption and do not provide correspondingly high quality. In contrast, techniques of the present disclosure for facilitating remote visual communications using holodoubles may provide higher quality visual communications (e.g., with reduced errors and/or artifacts) and with less bandwidth consumption (e.g., two or three orders of magnitude less bandwidth as compared to current video conferencing solutions).

In some instances, a user participating in video conferencing experiences a loss in available bandwidth. Rather than allowing the visual component of the video conferencing experience to end in response to the loss in bandwidth, systems of the present disclosure may automatically begin to utilize a holodouble to facilitate the visual component of the video conference. In some instances, one or more users will lack a sufficiently trained holodouble for contributing a visual component to the video conference. In such instances, the system may revert to utilizing a stylized representation of the user (rather than a personalized holodouble as described herein) to allow the user without a sufficiently trained holodouble to continue to participate visually in the video conference. For example, a stylized representation of the user may be designed by an artist and may be explicitly selected by the user or may be automatically selected based on similarity to the user's face. The stylized representation of the user may similarly be controlled using sparse data and/or holodouble rendering parameters, without transmitting image data for display at viewing devices.

Although the present disclosure has focused, in at least some respects, on implementing holodoubles for use on two-dimensional (2D) interfaces and displays (e.g., smartphones, laptops, tablets), one will appreciate, in view of the present disclosure, that the techniques described herein may be applied in 3D interfaces and displays. For example, a holodouble representation of a user may comprise a 3D representation of the user, which may be rendered and displayed to users in 3D format (e.g., in a virtual reality or augmented reality context). Similarly, although the present disclosure has focused in at least some respects on a holodouble being focused on providing a photorealistic representation of a user's face, a holodouble may provide a photorealistic representation of any portion(s) of a user's body (e.g., a user's entire body).

Example Method(s) for Facilitating Remote Visual Communication

The following discussion now refers to a number of methods and method acts that may be performed by the disclosed systems. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 6:
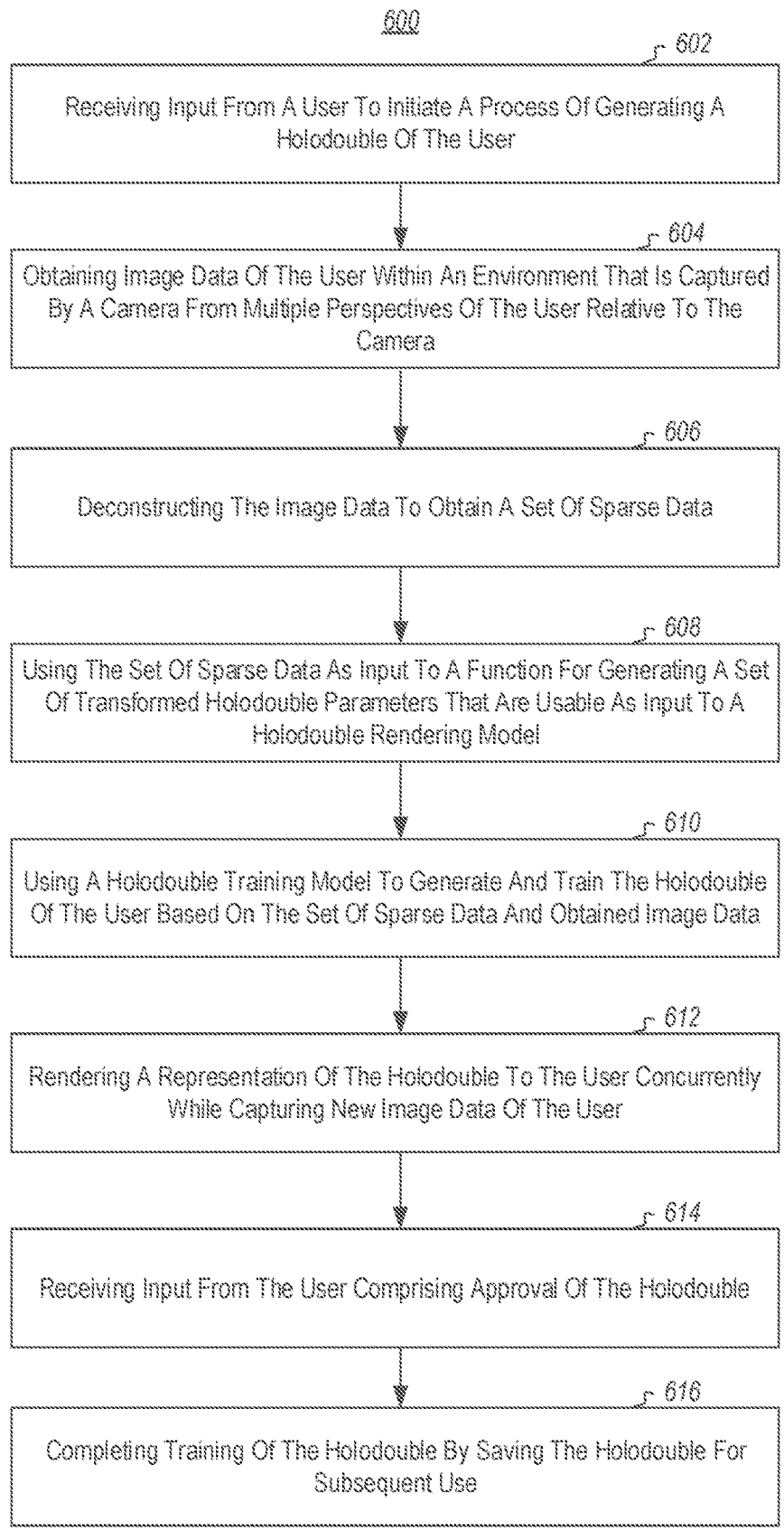
FIGS. 6-8 illustrate example flow diagrams depicting acts associated with facilitating low-bandwidth remote visual communication based on real-time imaging.
Figure 7:
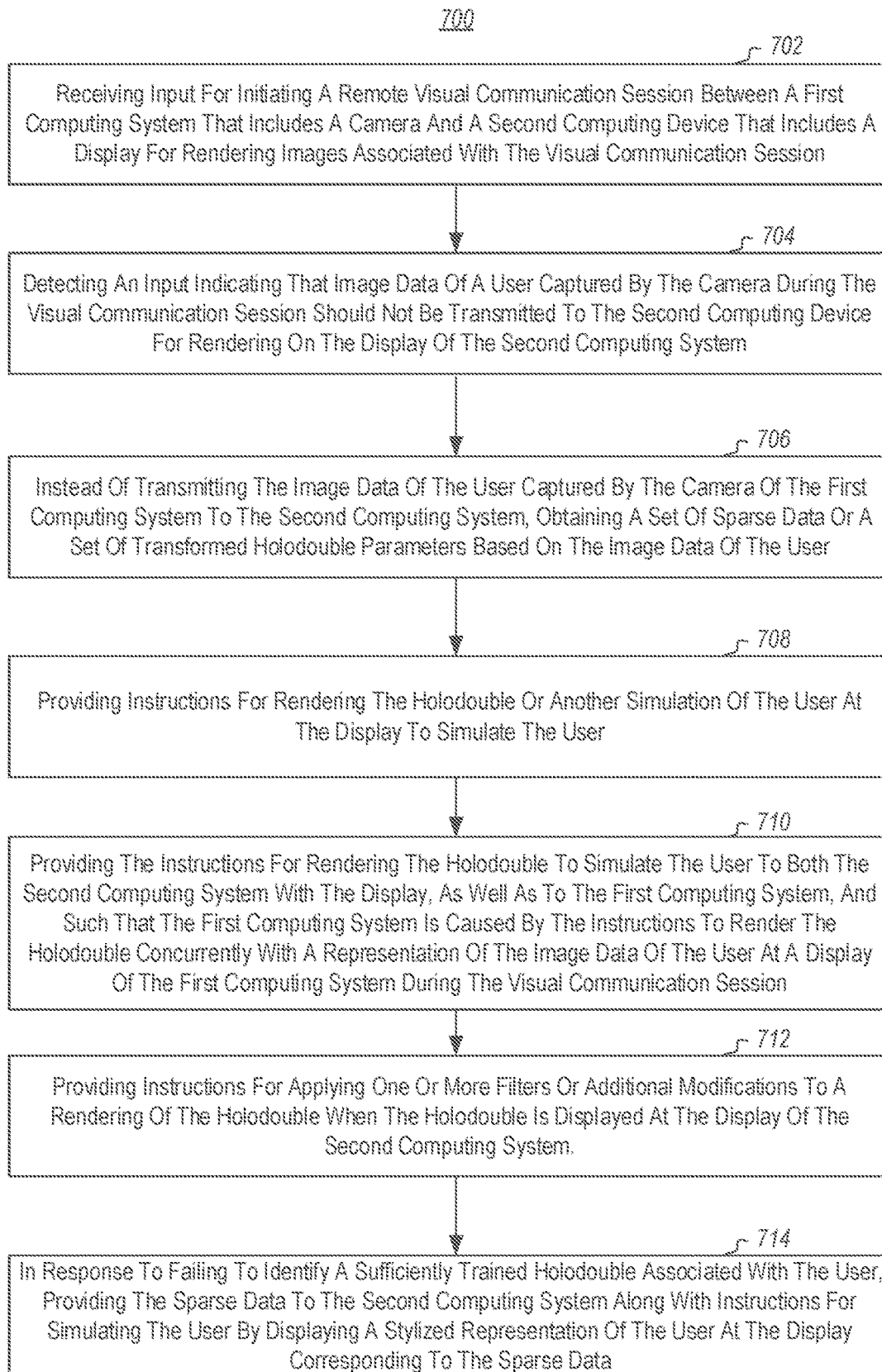
Figure 8:
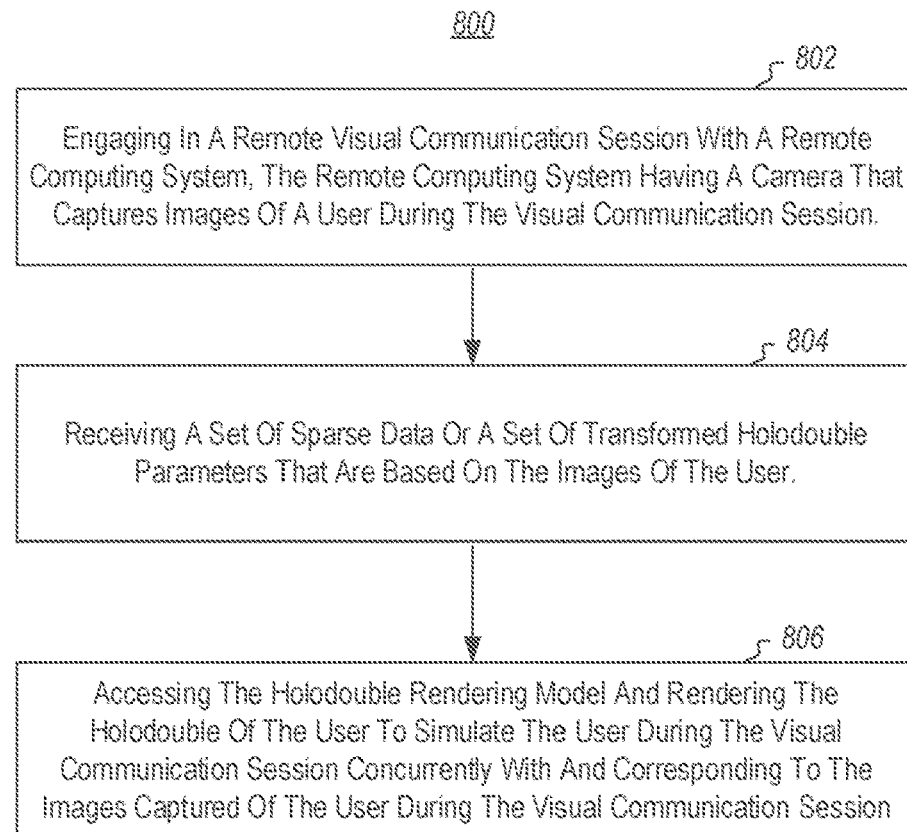

FIGS. 6, 7, and 8 illustrate example flow diagrams 600, 700, and 800, respectively, depicting acts associated with low-bandwidth remote visual communication. The discussion of the various acts represented in the flow diagrams include references to various hardware components described in more detail with reference to FIG. 1.

Act 602 of flow diagram 600 includes receiving input from a user to initiate a process of generating a holodouble of the user. Act 602 is performed, in some instances, by a system 100 utilizing processor(s) 102, storage 104, sensor(s) 110, I/O system(s) 116, communication system(s) 118, and/or other components. The holodouble comprises a photorealistic three-dimensional (3D) simulated representation of the user.

Act 604 of flow diagram 600 includes obtaining image data of the user within an environment that is captured by a camera from multiple perspectives of the user relative to the camera. Act 604 is performed, in some instances, by a system 100 utilizing processor(s) 102, storage 104, sensor(s) 110, I/O system(s) 116, communication system(s) 118, and/or other components. In some implementations, at least some image data used for training the holodouble is passively obtained during one or more image capture operations performed for a purpose independent of obtaining the set of sparse data for training the holodouble model.

Act 606 of flow diagram 600 includes deconstructing the image data to obtain a set of sparse data. Act 606 is performed, in some instances, by a system 100 utilizing processor(s) 102, storage 104, sensor(s) 110, holodouble training model 112, holodouble rendering model 114, I/O system(s) 116, communication system(s) 118, and/or other components. In some instances, the set of sparse data identifies one or more attributes associated with the image data the user. For example, in some implementations, the sparse data comprises facial landmarks.

Act 608 of flow diagram 600 includes using the set of sparse data as input to a function for generating a set of transformed holodouble parameters that are usable as input to a holodouble rendering model. Act 608 is performed, in some instances, by a system 100 utilizing processor(s) 102, storage 104, sensor(s) 110, holodouble training model 112, holodouble rendering model 114, I/O system(s) 116, communication system(s) 118, and/or other components. The holodouble rendering model is trained on image data and corresponding parameters to render photo-realistic representations of humans. The set of transformed holodouble parameters includes transformed values based on the set of sparse data. In some implementations, the set of transformed holodouble parameters quantifies or represents one or more facial expression, head pose, or facial element state. In some implementations, the set of transformed holodouble parameters quantifies or represents a directionality associated with a perspective of the camera relative to the user that exists during image capture of the user by the camera or a directionality associated with a desired perspective for rendering the user relative to a transposed camera position used when rendering the holodouble of the user. Furthermore, in some implementations, the set of transformed holodouble parameters quantifies or represents positional data for one or more facial landmarks of the user in the image data.

Act 610 of flow diagram 600 includes using a holodouble training model to generate and train the holodouble of the user based on the set of sparse data and obtained image data. Act 610 is performed, in some instances, by a system 100 utilizing processor(s) 102, storage 104, sensor(s) 110, holodouble training model 112, I/O system(s) 116, communication system(s) 118, and/or other components. In some implementations, the holodouble is enabled to be rendered from a plurality of different perspectives associated with the user, based on new image data of the user, including the multiple perspectives of the user relative to the camera, when the image data was obtained for generating and training the holodouble, as well as from one or more different perspectives of the user relative to one more cameras that capture the new image data of the user in subsequent image processing. The holodouble training model comprises a machine learned or machine learning model that has been trained on image data of humans and corresponding sparse data of attributes associated with the image data of the humans to generate and render simulations of the humans from different perspectives.

Act 612 of flow diagram 600 includes rendering a representation of the holodouble to the user concurrently while capturing new image data of the user. Act 612 is performed, in some instances, by a system 100 utilizing processor(s) 102, storage 104, sensor(s) 110, holodouble training model 112, holodouble rendering model 114, I/O system(s) 116, communication system(s) 118, and/or other components.

Act 614 of flow diagram 600 includes receiving input from the user comprising approval of the holodouble. Act 614 is performed, in some instances, by a system 100 utilizing processor(s) 102, storage 104, sensor(s) 110, I/O system(s) 116, communication system(s) 118, and/or other components.

Act 616 of flow diagram 600 includes completing training of the holodouble by saving the holodouble for subsequent use. Act 616 is performed, in some instances, by a system 100 utilizing processor(s) 102, storage 104, sensor(s) 110, holodouble training model 112, I/O system(s) 116, communication system(s) 118, and/or other components. The subsequent use may include one or more remote visual communication sessions in which the user is visually simulated at one or more second devices as the holodouble corresponding to and concurrently with images that are captured of the user during the one or more remote visual communication sessions at a first device.

In some implementations, one or more acts described hereinabove with reference to flow diagram 600 may be performed to generate multiple holodoubles for multiple user contexts.

Act 702 of flow diagram 700 of FIG. 7 includes receiving input for initiating a remote visual communication session between a first computing system that includes a camera and a second computing system that includes a display for rendering images associated with the visual communication session. Act 702 is performed, in some instances, by a system 100 utilizing processor(s) 102, storage 104, sensor(s) 110, I/O system(s) 116, communication system(s) 118, and/or other components. The input may comprise user input provided at the first computing system and/or the second computing system.

Act 704 of flow diagram 700 includes detecting an input indicating that image data of a user captured by the camera during the visual communication session should not be transmitted to the second computing system for rendering on the display of the second computing system. Act 704 is performed, in some instances, by a system 100 utilizing processor(s) 102, storage 104, sensor(s) 110, holodouble rendering model 114, I/O system(s) 116, communication system(s) 118, and/or other components. In some instances, the input also indicates that a holodouble associated with the user should be rendered at the display of the second computing system to simulate the user rather than displaying and using the image data of the user that was captured by the camera at the first computing system.

Furthermore, in some implementations, the holodouble is one of a plurality of holodoubles associated with different user contexts. In some instances, the holodouble is automatically selected from the plurality of holodoubles for simulating the user during the visual communication session without receiving explicit instructions from the user during the visual communication session to select the holodouble. In some instances, the holodouble is selected in response to user input selecting the holodouble for use during the visual communication session. The user input may be received subsequent to initiation of the visual communication session or as a configuration setting for initiating the visual communication session.

Act 706 of flow diagram 700 includes instead of transmitting the image data of the user captured by the camera of the first computing system to the second computing system, obtaining a set of sparse data or a set of transformed holodouble parameters based on the image data of the user. Act 706 is performed, in some instances, by a system 100 utilizing processor(s) 102, storage 104, sensor(s) 110, holodouble rendering model 114, I/O system(s) 116, communication system(s) 118, and/or other components. The set of sparse data identifies one or more attributes of the user and is obtained by deconstructing the image data of the user captured by the camera. The set of transformed holodouble parameters is generated from a transformation or processing of the set of sparse data to enable the transformed holodouble parameters to be usable as input to a holodouble rendering model that is configured to select and render a holodouble of the user that simulates the user in a photorealistic three-dimensional (3D) representation of the user with a different context or perspective than the user is presented with in the image data captured by the camera of the first computing system. The holodouble was previously approved for use by the user and was previously created by a holodouble training model comprising a machine learned or machine learning model that used previous image data of the user to create the holodouble and that was trained on image data of humans to generate and render simulations of the humans in one or more contexts and perspectives associated with the image data of the humans.

Act 708 of flow diagram 700 includes providing instructions for rendering the holodouble or another simulation of the user at the display to simulate the user. Act 708 is performed, in some instances, by a system 100 utilizing processor(s) 102, storage 104, sensor(s) 110, holodouble rendering model 114, I/O system(s) 116, communication system(s) 118, and/or other components. In some instances, the instructions for rendering the holodouble or another simulation of the user at the display are configured to simulate the user based on the set of sparse data or the set of transformed holodouble parameters while refraining from providing the image data captured by the camera at the first computing system to the second computing system. In some instances, the instructions cause the second computing system to render the holodouble at the display of the second computing system in a manner that simulates the user, concurrently with capturing of the image data of the user by the camera, but with a perspective of the user that is different than a perspective of the user that is represented by the image data of the user captured by the camera.

Act 710 of flow diagram 700 includes providing the instructions for rendering the holodouble to simulate the user to both the second computing system with the display, as well as to the first computing system, and such that the first computing system is caused by the instructions to render the holodouble concurrently with a representation of the image data of the user at a display of the first computing system during the visual communication session. Act 710 is performed, in some instances, by a system 100 utilizing processor(s) 102, storage 104, sensor(s) 110, holodouble rendering model 114, I/O system(s) 116, communication system(s) 118, and/or other components. In some implementations, the instructions cause the second computing system to render the holodouble at the display of the second computing system in a manner that simulates the user, concurrently with capturing of the image data of the user by the camera, but with a perspective of the user that is different than a perspective of the user that is represented by the image data of the user captured by the camera.

Act 712 of flow diagram 700 includes providing instructions for applying one or more filters or additional modifications to a rendering of the holodouble when the holodouble is displayed at the display of the second computing system. Act 712 is performed, in some instances, by a system 100 utilizing processor(s) 102, storage 104, sensor(s) 110, holodouble rendering model 114, I/O system(s) 116, communication system(s) 118, and/or other components.

Act 714 of flow diagram 700 includes, in response to failing to identify a sufficiently trained holodouble associated with the user, providing the sparse data to the second computing system along with instructions for simulating the user by displaying a stylized representation of the user at the display corresponding to the sparse data. Act 714 is performed, in some instances, by a system 100 utilizing processor(s) 102, storage 104, sensor(s) 110, holodouble rendering model 114, I/O system(s) 116, communication system(s) 118, and/or other components.

The various acts associated with flow diagram 700 may be performed by various entities. For example, in some instances, the system that performs one or more of the acts of flow diagram 700 includes a server remotely positioned from both the first computing system and the second computing system. In some instances, the system that performs one or more of the acts of flow diagram 700 includes the first computing system.

In some instances, the system that performs one or more of the acts of flow diagram 700 includes obtains the set of sparse data from the first computing system and generates the transformed holodouble parameters using the set of sparse data. In some instances, the system that performs one or more of the acts of flow diagram 700 receives the transformed holodouble parameters that were previously transformed from the sparse data by the first computing system.

Act 802 of flow diagram 800 of FIG. 8 includes engaging in a remote visual communication session with a remote computing system, the remote computing system having a camera that captures images of a user during the visual communication session. Act 802 is performed, in some instances, by a system 100 utilizing processor(s) 102, storage 104, sensor(s) 110, I/O system(s) 116, communication system(s) 118, and/or other components.

Act 804 of flow diagram 800 includes receiving a set of sparse data or a set of transformed holodouble parameters that are based on the images of the user. Act 804 is performed, in some instances, by a system 100 utilizing processor(s) 102, storage 104, sensor(s) 110, I/O system(s) 116, communication system(s) 118, and/or other components. In some instances, the set of sparse data identifies one or more attributes of the user and is obtained by deconstructing the images of the user that are captured by the camera of the first computing system during the visual communication session. In some implementations, the set of transformed holodouble parameters is generated from a transformation or processing of the set of sparse data to enable the transformed holodouble parameters to be usable as input to a holodouble rendering model that is configured to select and render a holodouble of the user that simulates the user in a photorealistic three-dimensional (3D) representation of the user with a different context or perspective than the user is presented with in the images captured by the camera of the first computing system during the visual communication session. The holodouble is previously approved for use by the user and is previously created by a holodouble training model comprising a machine learned or machine learning model that used previous image data of the user to create the holodouble and that was trained on image data of humans to generate and render simulations of the humans in one or more contexts and perspectives associated with the image data of the humans. In some implementations, the system performing act 804 obtains the set of sparse data and generates the transformed holodouble parameters using the set of sparse data. In some implementations, the system performing act 804 receives the transformed holodouble parameters without receiving the set of sparse data.

Act 806 of flow diagram 800 includes accessing the holodouble rendering model and rendering the holodouble of the user to simulate the user during the visual communication session concurrently with and corresponding to the images captured of the user during the visual communication session. Act 806 is performed, in some instances, by a system 100 utilizing processor(s) 102, storage 104, sensor(s) 110, holodouble rendering model 114, I/O system(s) 116, communication system(s) 118, and/or other components. In some implementations, the holodouble is rendered on the display device with at least one of a context or perspective of the user that is different than a corresponding context or perspective of the user that is represented in the images captured of the user by the camera during the visual communication session. In some instances, the holodouble simulates the user from a particular perspective that is different than the perspective represented by the images of the user captured by the camera during the visual communication session. In some implementations, the system renders the holodouble of the user during the visual communication session while refraining from receiving the images of the user that are captured by the camera during the visual communication session. Furthermore, in some instances, a notification may be presented at the display during the visual communication session that the holodouble is a simulation of the user, whereas, in other instances, a notification is refrained from being presented at the display that the holodouble is a simulation of the user.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for facilitating low-bandwidth remote visual communication based on real-time imaging, comprising:
   one or more processors; and
   one or more hardware storage devices storing instructions that are executable by the one or more processors to configure the system to:
      receive input from a user to initiate a process of generating a holodouble of the user, the holodouble comprising a photorealistic three-dimensional (3D) simulated representation of the user;
      obtain image data of the user within an environment that is captured by a camera from multiple perspectives of the user relative to the camera;
      deconstruct the image data to obtain a set of sparse data that identifies one or more attributes associated with the image data of the user;
      use a holodouble training model to generate and train the holodouble of the user based on the set of sparse data and obtained image data, the holodouble being enabled to be rendered from a plurality of different perspectives associated with the user, based on new image data of the user, including the multiple perspectives of the user relative to the camera, when the image data was obtained for generating and training the holodouble, as well as from one or more different perspectives of the user relative to one more cameras that capture the new image data of the user in subsequent image processing, the holodouble training model comprising a machine learned or machine learning model that has been trained on image data of humans and corresponding sparse data of attributes associated with the image data of the humans to generate and render simulations of the humans from different perspectives;
      render a representation of the holodouble to the user concurrently while capturing the new image data of the user;
      receive input from the user comprising approval of the holodouble; and
      complete training of the holodouble by saving the holodouble for subsequent use, the subsequent use including one or more remote visual communication sessions in which the user is visually simulated at one or more second devices as the holodouble corresponding to and concurrently with images that are captured of the user during the one or more remote visual communication sessions at a first device.

2. The system of claim 1, wherein at least some image data used for training the holodouble is passively obtained during one or more image capture operations performed for a purpose independent of obtaining the set of sparse data for training the holodouble model.

3. The system of claim 1, wherein the sparse data comprises facial landmarks.

4. The system of claim 1, wherein the instructions are executable by the one or more processors to further configure the system to use the set of sparse data as input to a function for generating a set of transformed holodouble parameters that are usable as input to a holodouble rendering model, the holodouble rendering model having been trained on image data and corresponding parameters to render photo-realistic representations of humans, the set of transformed holodouble parameters comprising transformed values based on the set of sparse data.

5. The system of claim 4, wherein the set of transformed holodouble parameters quantifies or represents one or more facial expression, head pose, or facial element state.

6. The system of claim 4, wherein the set of transformed holodouble parameters quantifies or represents a directionality associated with a perspective of the camera relative to the user that exists during image capture of the user by the camera or a directionality associated with a desired perspective for rendering the user relative to a transposed camera position used when rendering the holodouble of the user.

7. The system of claim 4, wherein the set of transformed holodouble parameters quantifies or represents positional data for one or more facial landmarks of the user in the image data.

8. The system of claim 1, wherein the image data captures the user within a first context, and wherein the holodouble of the user simulates the user within the first context, and wherein the instructions are executable by the one or more processors to further configure the system to:

obtain second image data of the user within a second context and from a second set of perspectives of the user relative to one or more cameras that capture the second image data;

deconstruct the second image data to obtain a second set of sparse data that identifies one or more attributes of at least the user during capture of the second image data in the second context; and use the holodouble training model to generate and train a second holodouble of the user based on the second set of sparse data and the obtained second image data.

9. The system of claim 1, wherein the instructions are executable by the one or more processors to further configure the system to:

receive input initiating participation in a remote visual communication session;

after having trained the holodouble of the user, obtain updated image data of the user;

deconstruct the image data to obtain a set of updated sparse data that identifies one or more attributes of the user;

generate a representation of the holodouble for simulating the user using input based on the set of updated sparse data; and display the representation of the holodouble simulating the user while obtaining newly updated image data of the user for generating newly updated representations of the holodouble for updated simulating of the user.

10. The system of claim 9, wherein the representation of the holodouble simulating the user is displayed concurrently with a representation of the updated image data of the user.

11. The system of claim 1, wherein the instructions are executable by the one or more processors to further configure the system to:

prior to receiving input from the user comprising approval of the holodouble and in response to receiving user input indicating that the holodouble fails to comprise a satisfactory representation simulating the user, obtain additional image data of the user; and use the additional image data to further train the holodouble.

12. A system for facilitating low-bandwidth remote visual communication based on real-time imaging, comprising:

one or more processors; and one or more hardware storage devices storing instructions that are executable by the one or more processors to configure the system to:

receive input for initiating a remote visual communication session between a first computing system that includes a camera and a second computing system that includes a display for rendering images associated with the visual communication session;

detect an input indicating that image data of a user captured by the camera during the visual communication session should not be transmitted to the second computing system for rendering on the display of the second computing system, the input also indicating that a holodouble associated with the user should be rendered at the display of the second computing system to simulate the user rather than displaying and using the image data of the user that was captured by the camera at the first computing system;

instead of transmitting the image data of the user captured by the camera of the first computing system to the second computing system, obtain a set of sparse data or a set of transformed holodouble parameters based on the image data of the user, the set of sparse data identifying one or more attributes of the user and being obtained by deconstructing the image data of the user captured by the camera, the set of transformed holodouble parameters being generated from a transformation or processing of the set of sparse data to enable the transformed holodouble parameters to be usable as input to a holodouble rendering model that is configured to select and render a holodouble of the user that simulates the user in a photorealistic three-dimensional (3D) representation of the user with a different context or perspective than the user is presented with in the image data captured by the camera of the first computing system, the holodouble having been previously approved for use by the user and having been previously created by a holodouble training model comprising a machine learned or machine learning model that used previous image data of the user to create the holodouble and that was trained on image data of humans to generate and render simulations of the humans in one or more contexts and perspectives associated with the image data of the humans; and provide instructions for rendering the holodouble or another simulation of the user at the display to simulate the user, based on the set of sparse data or the set of transformed holodouble parameters while refraining from providing the image data captured by the camera at the first computing system to the second computing system.

13. The system of claim 12, wherein the instructions cause the second computing system to render the holodouble at the display of the second computing system in a manner that simulates the user, concurrently with capturing of the image data of the user by the camera, but with a perspective of the user that is different than a perspective of the user that is represented by the image data of the user captured by the camera.

14. The system of claim 12, wherein the system comprises a server remotely positioned from both the first computing system and the second computing system.

15. The system of claim 12, wherein the system comprises the first computing system.

16. The system of claim 12, wherein the system further obtains the set of sparse data from the first computing system and generates the transformed holodouble parameters using the set of sparse data.

17. The system of claim 12, wherein the system receives the transformed holodouble parameters that were previously transformed from the sparse data by the first computing system.

18. The system of claim 12, wherein the holodouble is one of a plurality of holodoubles associated with different user contexts, and wherein the instructions are executable by the one or more processors to further configure the system to automatically select the holodouble from the plurality of holodoubles for simulating the user during the visual communication session without receiving explicit instructions from the user during the visual communication session to select the holodouble.

19. The system of claim 12, wherein the holodouble is one of a plurality of holodoubles associated with different user contexts, and wherein the instructions are executable by the one or more processors to further configure the system to select the holodouble and to generate the instructions in response to user input selecting the holodouble for use during the visual communication session, the user input being received subsequent to initiation of the visual communication session or as a configuration setting for initiating the visual communication session.

20. The system of claim 12, wherein the instructions are executable by the one or more processors to further configure the system to provide the instructions for rendering the holodouble to simulate the user to both the second computing system with the display, as well as to the first computing system, and such that the first computing system is caused by the instructions to render the holodouble concurrently with a representation of the image data of the user at a display of the first computing system during the visual communication session.

21. The system of claim 12, wherein the instructions are executable by the one or more processors to further configure the system to provide instructions for applying one or more filters or additional modifications to a rendering of the holodouble when the holodouble is displayed at the display of the second computing system.

22. The system of claim 12, wherein the instructions are executable by the one or more processors to further configure the system to, in response to failing to identify a sufficiently trained holodouble associated with the user, provide the sparse data to the second computing system along with instructions for simulating the user by displaying a stylized representation of the user at the display corresponding to the sparse data.

23. A system for facilitating low-bandwidth remote visual communication based on real-time imaging, comprising:
   one or more processors;
   a display device; and
   one or more hardware storage devices storing instructions that are executable by the one or more processors to configure the system to:
      engage in a remote visual communication session with a remote computing system, the remote computing system having a camera that captures images of a user during the visual communication session;
      receive a set of sparse data or a set of transformed holodouble parameters that are based on the images of the user, the set of sparse data identifying one or more attributes of the user and being obtained by deconstructing the images of the user that are captured by the camera of the remote computing system during the visual communication session, the set of transformed holodouble parameters being generated from a transformation or processing of the set of sparse data to enable the transformed holodouble parameters to be usable as input to a holodouble rendering model that is configured to select and render a holodouble of the user that simulates the user in a photorealistic three-dimensional (3D) representation of the user with a different context or perspective than the user is presented with in the images captured by the camera of the remote computing system during the visual communication session, the holodouble having been previously approved for use by the user and having been previously created by a holodouble training model comprising a machine learned or machine learning model that used previous image data of the user to create the holodouble and that was trained on image data of humans to generate and render simulations of the humans in one or more contexts and perspectives associated with the image data of the humans; and
      access the holodouble rendering model and render the holodouble of the user to simulate the user during the visual communication session concurrently with and corresponding to the images captured of the user during the visual communication session, the holodouble being rendered on the display device with at least one of a context or perspective of the user that is different than a corresponding context or perspective of the user that is represented in the images captured of the user by the camera during the visual communication session.

24. The system of claim 23, wherein the holodouble simulates the user from a particular perspective that is different than the perspective represented by the images of the user captured by the camera during the visual communication session.

25. The system of claim 23, wherein the system renders the holodouble of the user during the visual communication session while refraining from receiving the images of the user that are captured by the camera during the visual communication session.

26. The system of claim 25, wherein the instructions are executable by the one or more processors to further configure the system to present a notification at the display during the visual communication session that the holodouble is a simulation of the user.

27. The system of claim 25, wherein the instructions are executable by the one or more processors to further configure the system to refrain from presenting a notification at the display that the holodouble is a simulation of the user.

28. The system of claim 23, wherein the system obtains the set of sparse data and generates the transformed holodouble parameters using the set of sparse data.

29. The system of claim 23, wherein the system receives the transformed holodouble parameters without receiving the set of sparse data.

* * * * *